(12) United States Patent  
Kurtz et al.

(10) Patent No.: US 10,487,760 B2  
(45) Date of Patent: Nov. 26, 2019

(54) SYSTEM AND METHODS FOR REDUCING PARTICULATE MATTER EMISSIONS

(71) Applicant: Ford Global Technologies, LLC, Dearborn, MI (US)

(72) Inventors: Eric Matthew Kurtz, Dearborn, MI (US); Christopher Polonowski, Belleville, MI (US); James Eric Anderson, Dearborn, MI (US); Werner Willems, Aachen (DE); Nan Robarge, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 420 days.

(21) Appl. No.: 15/099,358

(22) Filed: Apr. 14, 2016

(65) Prior Publication Data

US 2017/0298850 A1    Oct. 19, 2017

(51) Int. Cl.
*F02D 41/02* (2006.01)
*F01N 11/00* (2006.01)
(Continued)

(52) U.S. Cl.
CPC .......... *F02D 41/029* (2013.01); *F01N 11/007* (2013.01); *F02D 19/0607* (2013.01); *F02D 19/0628* (2013.01); *F02D 19/0665* (2013.01); *F02D 19/0678* (2013.01); *F02D 19/0694* (2013.01); *F02D 19/081* (2013.01);
(Continued)

(58) Field of Classification Search
CPC .............. F01N 11/007; F01N 2560/05; F01N 2900/1402; F02D 13/0215; F02D 19/0607; F02D 19/0628; F02D 19/0665; F02D 19/0678; F02D 19/0694; F02D 19/081; F02D 19/084; F02D 41/0025; F02D 41/029; F02D 41/1466; F02D 41/3845; F02D 41/3863; Y02T 10/36

See application file for complete search history.

(56) References Cited

U.S. PATENT DOCUMENTS 4,471,744 A    9/1984  Holtz
4,594,201 A    6/1986  Phillips et al.
(Continued)

FOREIGN PATENT DOCUMENTS

CN    104747339 A    7/2015

OTHER PUBLICATIONS

Manin, Julien et al., "Effects of Oxygenated Fuels on Combustion and Soot Formation/Oxidation Processes," SAE Int. J. Fuels Lubr., vol. 7(3), pp. 704-717, Oct. 13, 2014, 14 pages.

*Primary Examiner* — Grant Moubry  
*Assistant Examiner* — Ruben Picon-Feliciano  
(74) *Attorney, Agent, or Firm* — Geoffrey Brumbaugh; McCoy Russell LLP

(57) ABSTRACT

A method may comprise: positioning a pressure control valve (PCV) at an outlet of a fuel rail; positioning a volume control valve (VCV) at an inlet of a high pressure pump; and in response to an exhaust particulate matter (PM) level deviating from a target PM level, adjusting a fuel ratio of a first fuel and a second fuel delivered to an engine, and opening one of the PCV and the VCV. In this way, the fuel oxygen content may be adjusted to maintain a PM at or below a target level without a DPF over a broad range of engine designs and operating conditions, while maintaining fuel economy.

3 Claims, 7 Drawing Sheets

(51) Int. Cl.
  *F02D 41/14* (2006.01)
  *F02D 41/38* (2006.01)
  *F02D 19/06* (2006.01)
  *F02D 19/08* (2006.01)
  *F02D 41/00* (2006.01)
  *F02D 13/02* (2006.01)

(52) U.S. Cl.
  CPC ....... *F02D 19/084* (2013.01); *F02D 41/0025* (2013.01); *F02D 41/1466* (2013.01); *F02D 41/3845* (2013.01); *F02D 41/3863* (2013.01); *F01N 2560/05* (2013.01); *F01N 2900/1402* (2013.01); *F02D 13/0215* (2013.01); *Y02T 10/36* (2013.01)

(56) References Cited

U.S. PATENT DOCUMENTS

| | | |
|---|---|---|
| 5,469,830 A | 11/1995 | Gonzalez |
| 5,560,344 A | 10/1996 | Chan |
| 5,921,263 A | 7/1999 | Negley, III |
| 6,006,775 A | 12/1999 | Negley, III |
| 6,820,587 B1 | 11/2004 | Hoglund et al. |
| 6,845,608 B2 | 1/2005 | Klenk et al. |
| 6,990,956 B2 | 1/2006 | Niimi |
| 7,712,451 B2 | 5/2010 | Hung et al. |
| 8,051,829 B2 | 11/2011 | Kurtz et al. |
| 8,166,943 B2 | 5/2012 | Chamarthi et al. |
| 8,220,439 B2 | 7/2012 | Fisher |
| 8,267,065 B2 | 9/2012 | Kurtz et al. |
| 8,281,772 B2 | 10/2012 | Kurtz et al. |
| 8,528,522 B2 | 9/2013 | Li |
| 8,550,060 B2 | 10/2013 | Kurtz et al. |
| 8,849,541 B2 | 9/2014 | Swann |
| 8,899,209 B2 | 12/2014 | Kurtz et al. |
| 2004/0144339 A1 | 7/2004 | Hattori et al. |
| 2004/0163631 A1 | 8/2004 | Leini et al. |
| 2009/0049823 A1* | 2/2009 | Khadiya ............... F01N 3/0253 60/284 |
| 2013/0220239 A1* | 8/2013 | McCann .................. F02B 43/08 123/3 |
| 2014/0336901 A1 | 11/2014 | Roberts et al. |
| 2015/0083075 A1 | 3/2015 | Kurtz et al. |

* cited by examiner

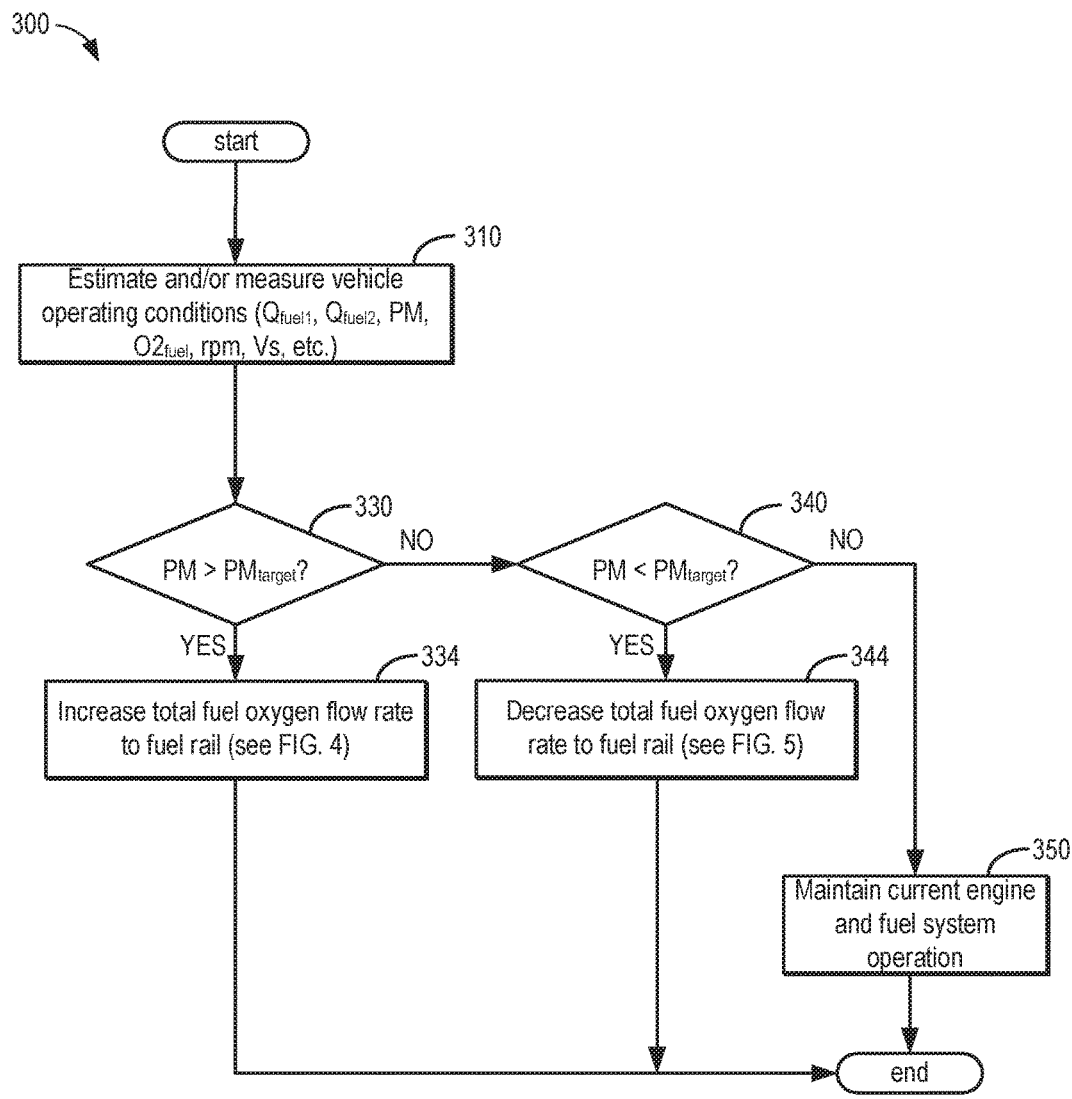

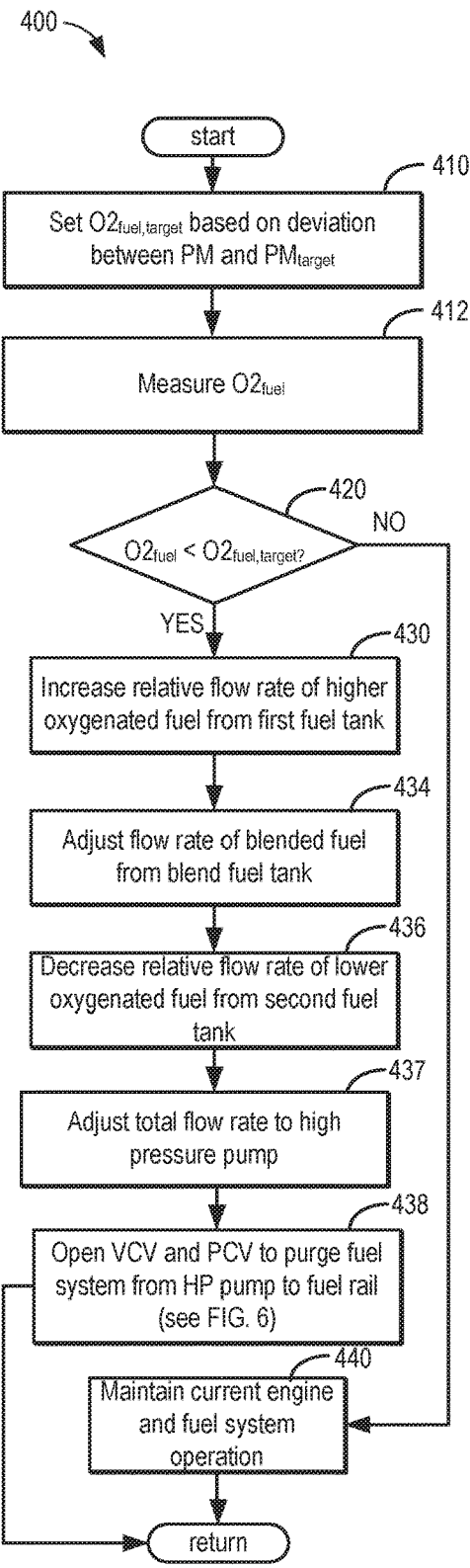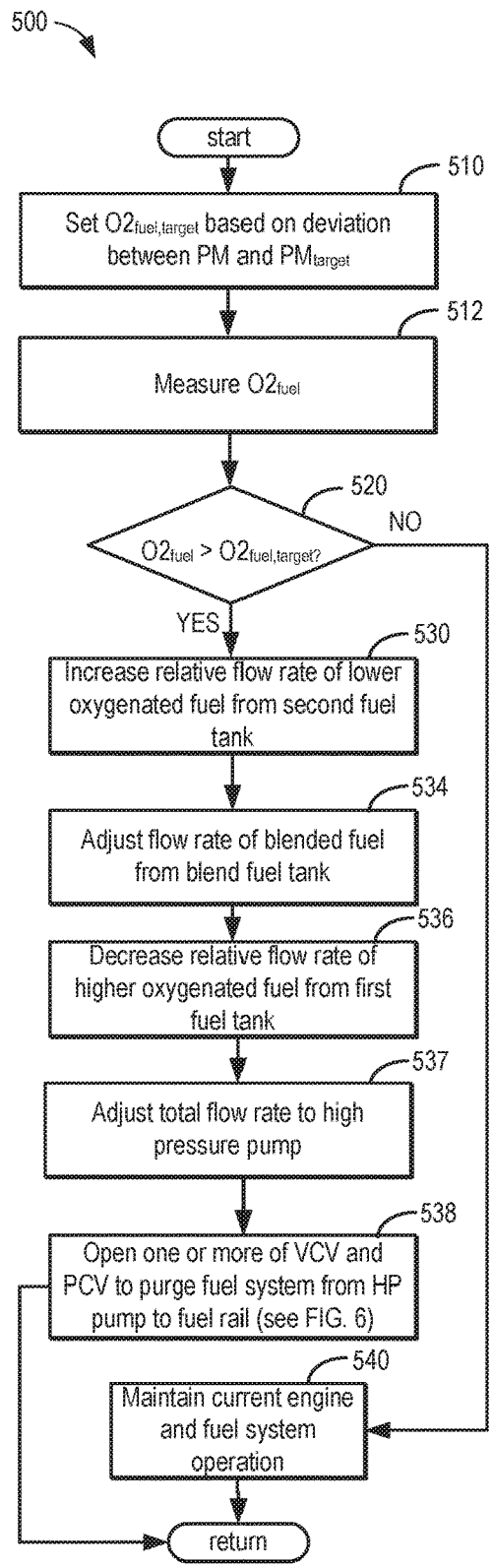

SYSTEM AND METHODS FOR REDUCING PARTICULATE MATTER EMISSIONS

BACKGROUND AND SUMMARY

Diesel engines commonly include diesel particulate filters (DPFs) to reduce emission of soot and other particulate matter (PM) from diesel fuel combustion. However, DPFs increase drivetrain cost, complexity, and weight, and can reduce engine performance and fuel economy. Increasing the fuel oxygen content is one method that may reduce the PM emission levels such that a DPF may be foregone. Introduction of a higher oxygen-containing fuel into the engine combustion chambers may promote more uniform combustion and reduce fuel-rich regions within the combustion chambers, where soot and PM tend to form.

However, the inventors herein have recognized various issues with the above approach. Namely, a fuel oxygen content corresponding to a large enough reduction in PM to meet engine emissions standards (without a DPF) depends on many factors, including the design of the engine and combustion system. Accordingly, combustion of a fuel having a higher fuel oxygen content may overly penalize or may unnecessarily reduce the fuel economy of an engine operating under conditions where PM emissions are inherently lower.

In one example, the issues described above may be at least partially addressed by a method comprising: positioning a pressure control valve (PCV) at an outlet of a fuel rail; positioning a volume control valve (VCV) at an inlet of a high pressure pump; and in response to an exhaust particulate matter (PM) level deviating from a target PM level, adjusting a fuel ratio of a first fuel and a second fuel delivered to an engine, and opening one of the PCV and the VCV.

In another example, a method for an engine may comprise: estimating a fuel oxygen content of fuel delivered to the engine; and in response to the fuel oxygen content deviating from a target fuel oxygen content, adjusting a flow of a first higher oxygenated fuel from a first fuel tank and a flow of a second lower oxygenated fuel from a second fuel tank to a fuel rail of the engine, and opening one of a pressure control valve (PCV) and a volume control valve (VCV), wherein opening the PCV purges fuel from a fuel rail upstream from the engine, and opening the VCV purges fuel from a high pressure fuel pump upstream from the fuel rail.

In another example, a vehicle system may comprise: an engine; a fuel system, including a first fuel tank, a second fuel tank, a pressure control valve (PCV) positioned between a fuel rail and a blend fuel tank and a volume control valve (VCV) positioned between a high pressure fuel pump and the blend fuel tank; and a controller, with executable instructions to, in response to an exhaust particulate matter (PM) level deviating from a target PM level, purge fuel from the high pressure fuel pump to the blend fuel tank by opening the VCV, purge fuel from the fuel rail to the blend fuel tank by opening the PCV, and adjust a fuel oxygen content delivered to the engine by adjusting a fuel flow rate from one of the first fuel tank, the second fuel tank, and the blend fuel tank.

In this way, the fuel oxygen content may be adjusted to achieve the technical result of maintaining a PM at or below a target level without a DPF over a broad range of engine designs and operating conditions, while maintaining fuel economy. Furthermore, by adjusting an opening of one or more of the VCV, and the PCV, fuel may be more rapidly purged from the high pressure side of the fuel system (e.g., high pressure pump, fuel rail) and fuel lines leading to the high pressure pump and the fuel rail, thereby making adjustments to fuel oxygen content can be more responsive, further reducing PM emissions and increasing fuel economy. Further still, $CO_2$ emissions may be reduced due to reduced exhaust system back pressure as a DPF may be eliminated, which in turn can increase engine power and torque, and may enable engine downsizing. Further still, the technical result of eliminating the DPF from the exhaust system lowers manufacturing costs and may enable further significant cost reductions for other related engine components such as the NOx aftertreatment or the EGR system. Eliminating the DPF from the exhaust system also eliminates the need for DPF regeneration which further reduces PM and $CO_2$ emissions and increases fuel economy. Further still, in a vehicle system engine comprising a DPF, the methods and systems described herein may be utilized to reduce frequency of DPF regeneration, thereby reducing both fuel consumption and PM emissions, and prolonging a life of the DPF.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows a vehicle combustion engine.

FIGS. 3-6 show flow charts of an example method for reducing particle emissions.

DETAILED DESCRIPTION

Figure 1:
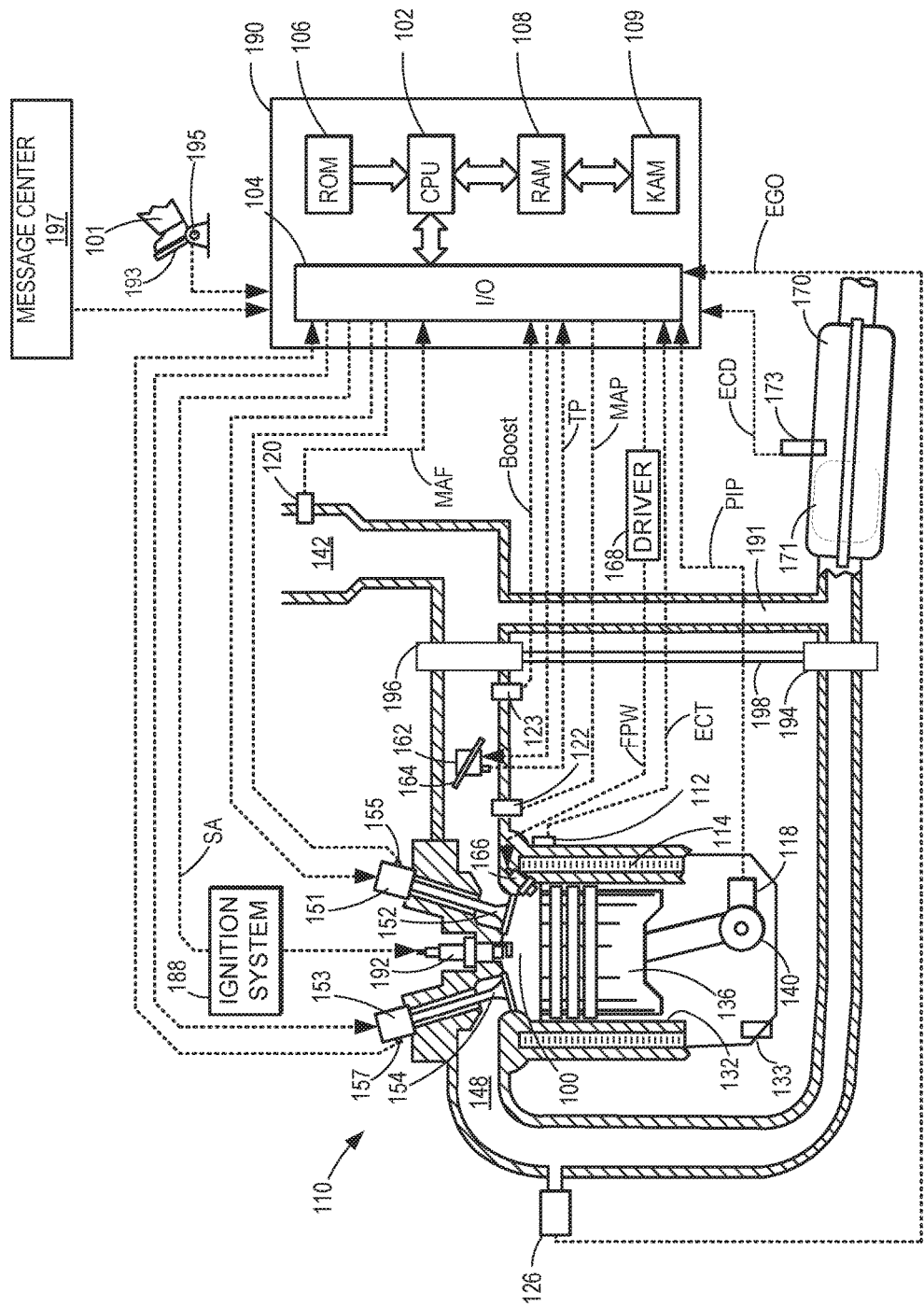
Figure 7:
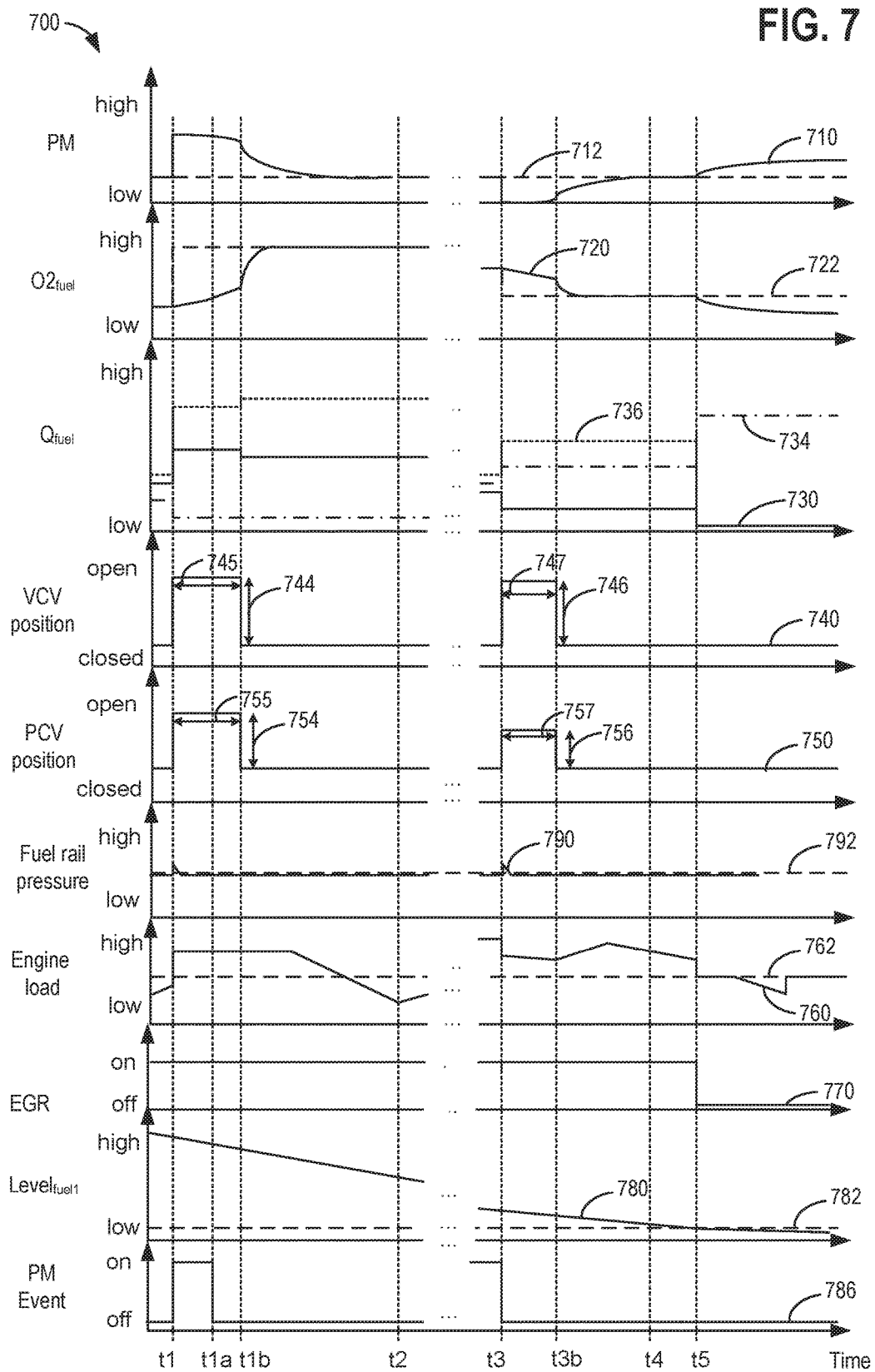
FIGS. 7-8 show example timelines for reducing particle emissions according to the method shown in FIGS. 3-6.
Figure 8:
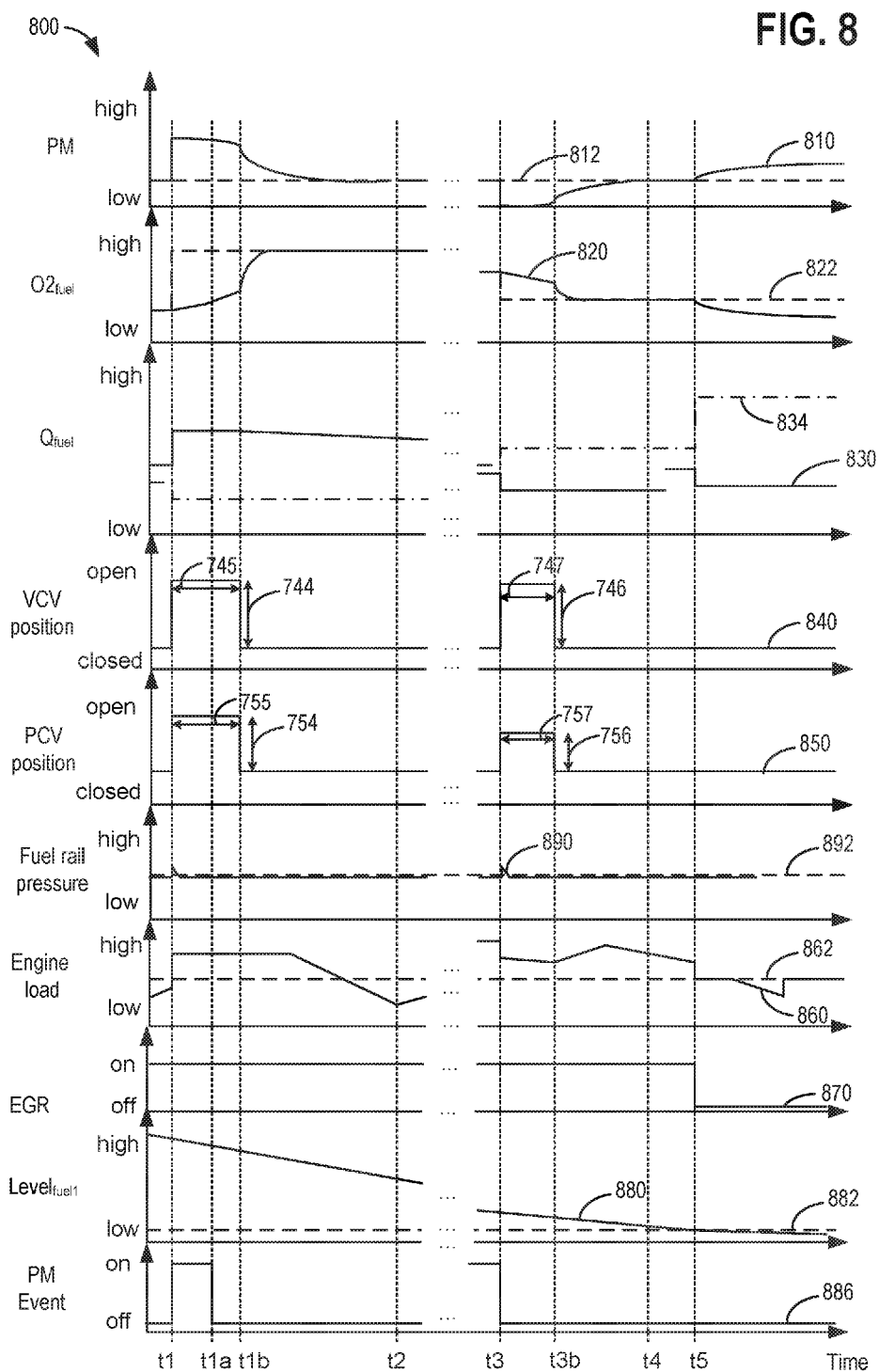

This detailed description relates to systems and methods for reducing particulate matter (PM) emissions from a vehicle combustion engine, such as the engine of FIG. 1. In response to a PM level deviating from a target PM level in the engine, fuel oxygen content delivered to the engine from the fuel system shown in FIG. 2 may be adjusted. In particular, a controller may perform executable instructions, as shown in the flow charts of FIGS. 3-6, to adjust the fuel oxygen content delivered to the engine responsive to a PM level deviating from the target PM level. Furthermore, the controller may perform executable instructions, as shown in the flow chart of FIGS. 3-6, to open of one or more of a volume control valve (VCV) and a pressure control valve (PCV) responsive to the exhaust PM deviating from the target PM, and responsive to the fuel oxygen content deviating from a target fuel oxygen content. As shown in the fuel system of the engine in FIG. 2, the VCV may be positioned at an inlet to the high pressure fuel pump between the high pressure fuel pump and a fuel tank, and the PCV may be positioned at an outlet of the fuel rail between the fuel rail and the fuel tank. The adjustment of the fuel oxygen content and the opening of the VCV and/or the PCV responsive to the PM level deviating from the target PM level and the fuel oxygen content deviating from the target fuel oxygen content are illustrated by the timelines of FIGS. 7-8.

In this way, the fuel oxygen content may be more rapidly adjusted to achieve the technical result of maintaining a PM at or below a target level without a DPF over a broad range of engine designs and operating conditions, while maintaining fuel economy. Furthermore, by adjusting an opening of one or more of the VCV and the PCV, adjustments to fuel oxygen content can be more responsive, further reducing PM emissions and increasing fuel economy. Further still, CO2 emissions may be reduced due to reduced exhaust system back pressure from the elimination of the DPF, which in turn can increase engine power and torque, and may enable significant engine downsizing. Further still, the technical result of eliminating the DPF from the exhaust system lowers manufacturing costs and may enable further cost reductions for other related engine components such as the NOx aftertreatment or the EGR system. Eliminating the DPF from the exhaust system also eliminates the need for DPF regeneration which further reduces PM and CO2 emissions and increases fuel economy. Further still, in a vehicle system engine comprising a DPF, the methods and systems described herein may be utilized to reduce frequency of DPF regeneration, thereby reducing both fuel consumption and PM emissions, and prolonging a life of the DPF.

FIG. 1 illustrates a non-limiting example of a cylinder 100 of engine 110, including the intake and exhaust system components that interface with the cylinder. Note that cylinder 100 may correspond to one of a plurality of engine cylinders. Cylinder 100 is at least partially defined by combustion chamber walls 132 and piston 136. Piston 136 may be coupled to a crankshaft 141 via a connecting rod, along with other pistons of the engine. Crankshaft 141 may be operatively coupled with a drive wheel and/or a generator, via a transmission.

Cylinder 100 may receive intake air via an intake passage 142. Intake passage 142 may also communicate with other cylinders of engine 110. Intake passage 142 may include a throttle 162 including a throttle plate 164 that may be adjusted by control system 190 to vary the flow of intake air that is provided to the engine cylinders. Cylinder 100 can communicate with intake passage 142 via one or more intake valves 152. Cylinder 100 may exhaust products of combustion via an exhaust passage 148. Cylinder 100 can communicate with exhaust passage 148 via one or more exhaust valves 154.

Figure 2:
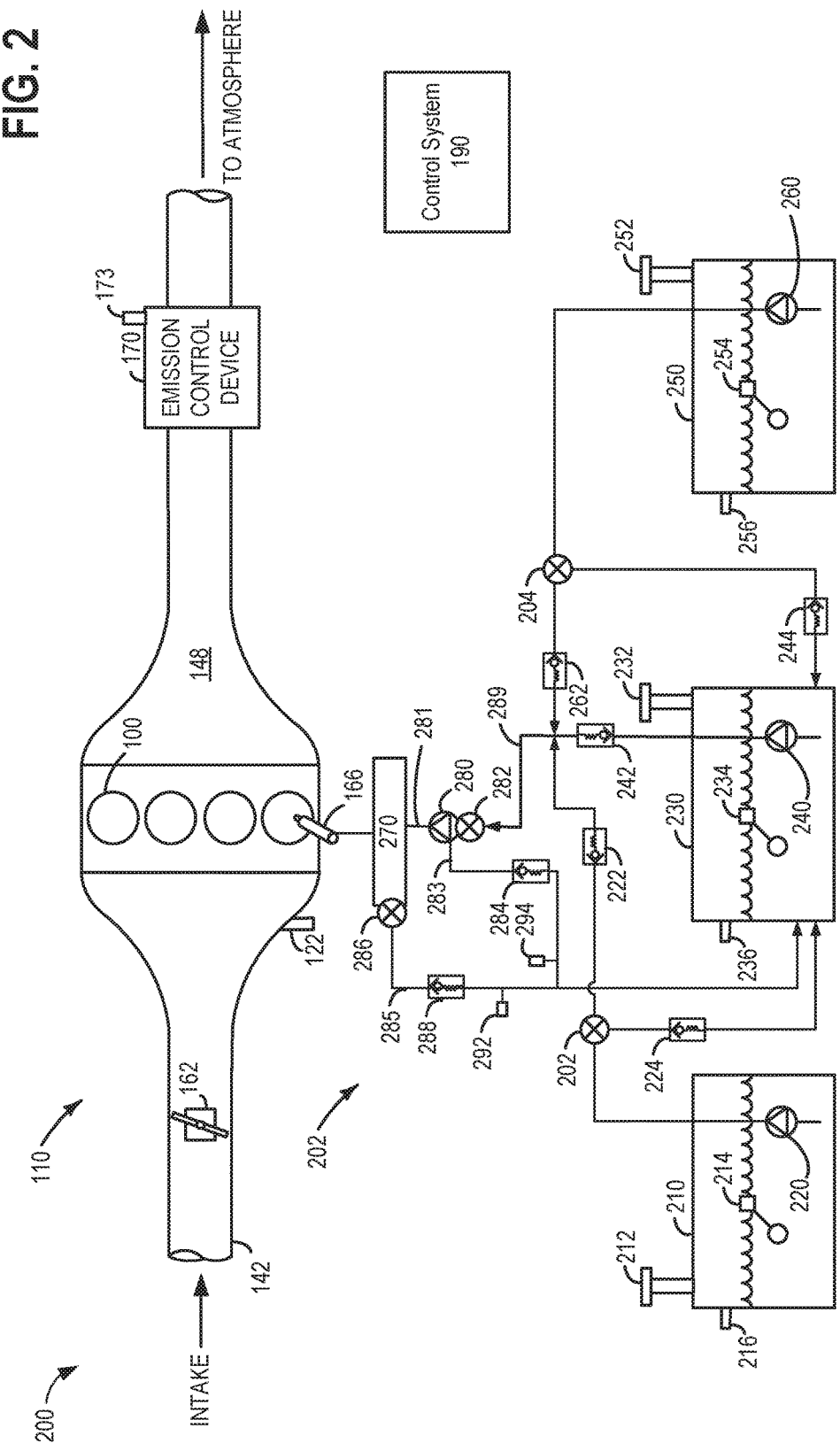
FIG. 2 shows an abbreviated schematic of the engine of FIG. 1, and an example fuel system fluidly coupled to the engine of FIG. 1.
Figure 6:
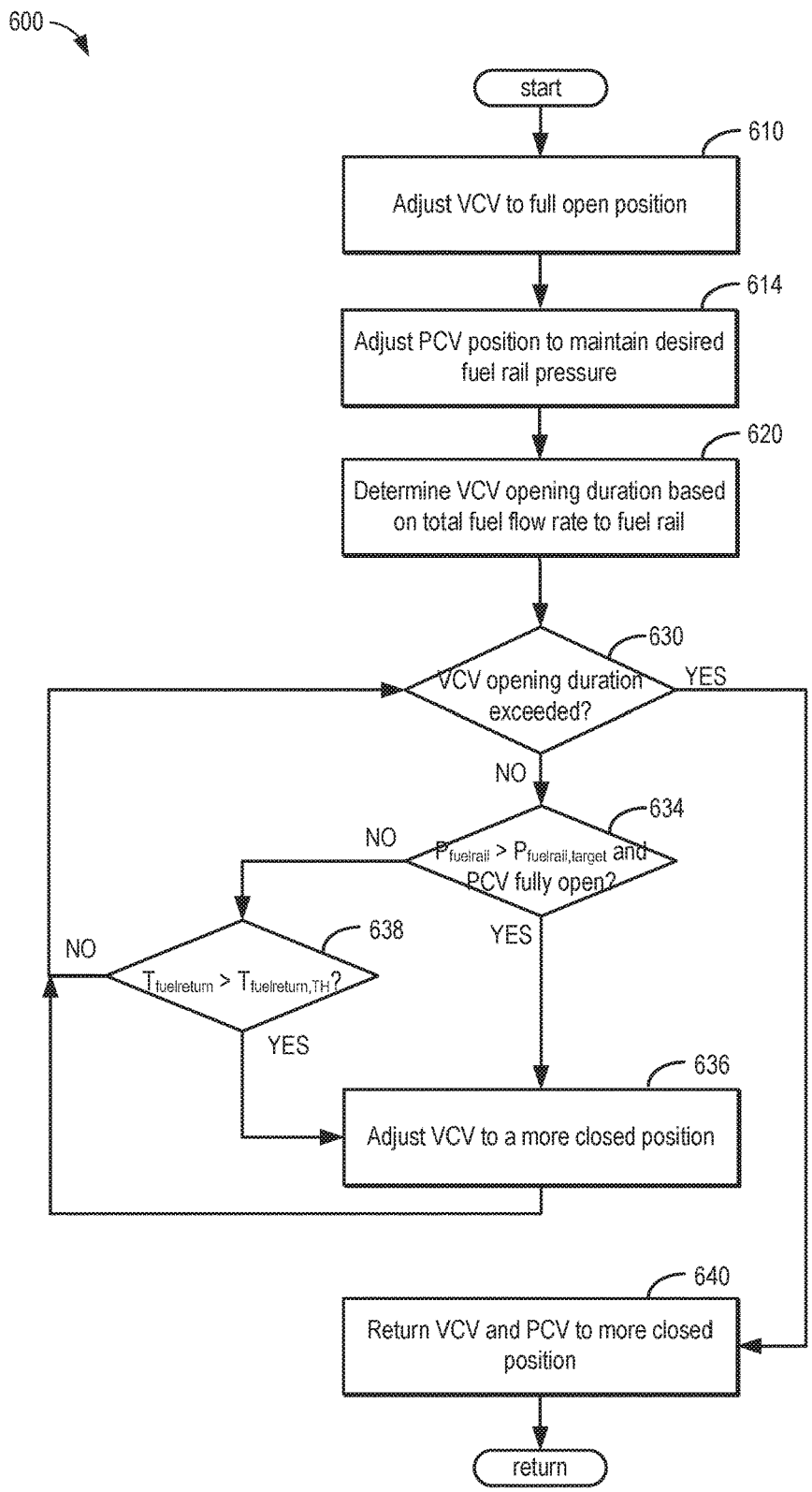

In some embodiments, cylinder 100 may optionally include a spark plug 192, which may be actuated by an ignition system 188. A fuel injector 166 may be provided in the cylinder to deliver fuel directly thereto. However, in other embodiments, the fuel injector may be arranged within intake passage 142 upstream of intake valve 152. Fuel injector 166 may be actuated by a driver 168. Fuel injector 166 may be coupled to fuel system 201 (as shown in FIG. 2) and may receive fuel via one or more fuel rails 270 (see FIG. 2).

Engine 110 may be a boosted engine including a boosting device, such as turbocharger, including a compressor 196, arranged along intake passage 142, and a turbine 194, arranged along exhaust passage 148. The amount of boost provided by the turbocharger may be varied by the control system 190. An optional charge after-cooler (not shown) may be included downstream of compressor 196 in the intake passage to reduce the temperature of the intake air compressed by the turbocharger. Compressor 196 may be rotationally coupled to the turbine 194 via shaft 198.

Engine 110 may further include one or more exhaust gas recirculation (EGR) passages for recirculating at least a portion of exhaust gas from exhaust passage 148 to intake passage 142. For example, the engine may include a low-pressure EGR (LP-EGR) system with an LP-EGR passage 191 coupling the engine exhaust, downstream of turbine 194, to the engine intake, upstream of compressor 196. The LP-EGR system may be operated during conditions such as in the presence of turbocharger boost and/or when exhaust gas temperature is above a threshold. An EGR valve (not shown) positioned in LP-EGR passage 191 upstream of the compressor may be configured to adjust an amount and/or rate of exhaust gas diverted through the EGR passage. LP-EGR passage 191 may further include an LP-EGR cooler to lower the temperature of exhaust gas being recirculated into the engine intake. In alternate embodiments, a high-pressure EGR (HP-EGR) system (not shown) may also be included wherein a HP-EGR passage may be configured to divert at least some exhaust gas from the engine exhaust, upstream of the turbine 194, to the engine intake passage 142, downstream of the compressor 196.

Emission control device (ECD) 170 is shown arranged along exhaust passage 148 downstream of exhaust gas sensor 126, and may include a plurality of emission control devices. The one or more emission control devices may include a three-way catalyst, lean NOx trap (LNT), particulate filter, oxidation catalyst, etc. In the example shown in FIG. 2, ECD 170 includes one or more three-way catalysts (TWC) 171. ECD 170 may further include other emission control devices (e.g., selective catalytic reduction system, NOx trap) or combinations thereof. Engine 110 may further include a urea injection system (e.g., urea storage tank, urea pump, urea valve, urea lines) fluidly coupled to the ECD 170, specifically a NOx catalyst therein, for reducing NOx emissions. In other embodiments, TWC 171 (and other ECD devices) may be integrated in a unitary housing. As described in further detail below, various operational aspects of engine 110 may be controlled to facilitate the performance of ECD 170. Accordingly, ECD 170 may operate without a particulate filter, such as a diesel particulate filter (DPF), utilizing the systems and methods described with reference to FIGS. 2-8 to reduce PM levels. In some examples, the ECD 170 may include a particulate filter, such as a DPF, and the systems and methods described herein with reference to FIGS. 2-8 may be utilized to reduce a frequency of particulate filter regeneration, thereby reducing fuel consumption while reducing PM levels while prolonging a life of the particulate filter.

A non-limiting example of control system 190 is depicted schematically in FIG. 1. Control system 190 may include a processing subsystem (CPU) 102, which may include one or more processors. CPU 102 may communicate with memory, including one or more of read-only memory (ROM) 106, random-access memory (RAM) 108, and keep-alive memory (KAM) 109. As a non-limiting example, this memory may store instructions that are executable by the processing subsystem. The process flows, functionality, and methods described herein may be represented as instructions stored at the memory of the control system that may be executed by the processing subsystem.

CPU 102 can communicate with various sensors and actuators of engine 110 via an input/output device 104. As a non-limiting example, these sensors may provide sensory feedback in the form of operating condition information to the control system, and may include: an indication of mass airflow (MAF) through intake passage 142 via sensor 120, an indication of manifold air pressure (MAP) via sensor 122, an indication of throttle position (TP) via throttle 162, an indication of engine coolant temperature (ECT) via sensor 112 which may communicate with coolant passage 114, an indication of engine speed (PIP) via sensor 118, an indication of exhaust gas oxygen content (EGO) via exhaust gas composition sensor 126, an indication of positive crankcase ventilation exhaust gas moisture and hydrocarbon content via positive crankcase ventilation exhaust line gas sensor 133, an indication of intake valve position via sensor 155, and an indication of exhaust valve position via sensor 157, among others. For example, sensor 133 may be a humidity sensor, oxygen sensor, hydrocarbon sensor, and/or combinations thereof. Sensor 173 may represent one or more ECD sensors that measures one or more temperatures or pressures associated with the ECD. In addition, ECD sensor 173 may also comprise a particulate matter (PM) sensor (e.g., electrode, photodiode, pressure sensor, temperature sensor) that indicates the quantity of PM in the exhaust stream, including a quantity of PM at the ECD 170. ECD sensor may transmit signal ECD, including measured temperatures, pressures, and PM quantities in the exhaust to control system 190.

PM may be generated from fuel combustion under rich conditions. Despite an overall lean air-fuel ratio, a diffusion flame within an engine combustion cylinder may comprise richer combustion regions, where soot can be formed. Furthermore, during richer combustion conditions, reduced oxygen concentrations in the combustion cylinders reduces soot oxidation rates once the soot is formed. Increasing fuel oxygen content can reduce richer combustion regions, thereby reducing PM generation. Increasing an amount of higher oxygenated fuel delivered to the engine during engine operation where higher PM levels may be generated can aid in reducing PM emissions. An example of engine operation where higher PM levels may be generated from fuel combustion includes aggressive aftertreatment heating methods incorporating one or more of early exhaust valve opening, internal exhaust gas recirculation, and intake heating. Another example of engine operation where higher PM levels may be generated from fuel combustion includes cylinder deactivation, in which the load of operational cylinders is relatively high, but mass flow of exhaust through a turbine 194 coupled to a turbocharger compressor 196 is low causing low boost pressure. Another example of engine operation where higher PM levels may be generated from fuel combustion includes rich engine operation for LNT regeneration or diesel desulfurization (DeSox). For engine systems including a DPF, PM emissions may be higher while the DPF regeneration is performed. Accordingly, the methods and systems described herein for reducing PM levels, may be employed in response to engine operation where higher PM levels may be generated, including the examples described herein.

Furthermore, the control system may control operation of the engine 110, including cylinder 100 via one or more of the following actuators: driver 168 to vary fuel injection timing and quantity, ignition system 188 to vary spark timing and energy, intake valve actuator 251 to vary intake valve timing, exhaust valve actuator 153 to vary exhaust valve timing, and throttle 162 to vary the position of throttle plate 164, among others. Note that intake and exhaust valve actuators 151 and 153 may include electromagnetic valve actuators (EVA) and/or cam-follower based actuators. Control system 190 may receive an indication of an operator requested output of the vehicle propulsion system from a vehicle operator 101. For example, control system 190 may receive sensory feedback from pedal position sensor 195 which communicates with pedal 193. Pedal 193 may refer schematically to a brake pedal and/or an accelerator pedal.

Engine 110 may also include a message center 197. The message center 197 may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a sensor that indicates if one or more fuel tanks in the fuel system 201 (see FIG. 2) have been depleted. These devices may be connected to control system 190. In one example, the control system may provide an audio and/or visual indication at message center 197 responsive to a sensor 199 indicating that one or more fuel tanks have been depleted of fuel (or the fuel level has decreased below a threshold fuel level). In another example, the message center 197 may notify the operator of engine operation adjustments (e.g., reducing engine load below a threshold load, switching off exhaust gas recirculation, and the like) responsive to depletion of fuel from one or more fuel tanks.

Turning now to FIG. 2, it illustrates an example configuration of a fuel system 201 coupled to engine 110 for delivering fuel to the engine 110 via one or more fuel injectors 166. As shown in FIG. 2, fuel is directly injected into engine cylinders 100 from fuel rail 270, however, in other examples, fuel may be delivered to engine 110 via port-fuel injection. In addition, to reduce engine noise, fuel injection may include pilot injection whereby a small amount of fuel is injected to injector 166 immediately prior to a main power-producing pulse injection of fuel. Fuel system 201 may include multiple fuel tanks 210, 230, and 250. Fuel system 201 may also include fuel rail 270 and high pressure pump 280. Fuel system 201 may deliver one or more fuels (or a blend thereof) from one or more of fuel tanks 210, 230, and 250 to the high pressure pump 280 by actuating low pressure fuel pumps 220, 240, and 260 via control system 190. High pressure pump 280 may be actuated by control system 190 to deliver fuel to fuel rail 270 and one or more fuel injectors 166.

In one example, fuel tank 210 may be used to store a higher oxygenated fuel, fuel tank 250 may be used to store a lower oxygenated fuel, and fuel tank 230 may be used to store fuel blends of the higher oxygenated fuel and the lower oxygenated fuel. During a fuel tank refueling event, fuel may be pumped into the vehicle from an external source through refueling doors 212, 232, and 253, corresponding to fuel tanks 210, 230, and 250, respectively. The fuel in fuel tanks 210, 230, and 250 may comprise a plurality of fuel blends, including fuel with a range of alcohol concentrations, such as various gasoline-ethanol blends, including E10, E85, gasoline, diesel, diesel oxygenates (e.g., alcohols, ethers, glycol ethers, acetals, esters, carbonates, and the like) etc., and combinations thereof, however, as mentioned above, the fuel in fuel tank 210 comprises a higher oxygenated fuel, the fuel in fuel tank 250 comprises a lower oxygenated fuel and the fuel in fuel tank 230 may comprise a blended fuel having a fuel oxygen content intermediate to the higher oxygenated fuel and the lower oxygenated fuel.

Fuel level sensors 214, 234, and 254 located in fuel tanks 210, 230, and 250, respectively, may provide an indication of the fuel level to control system 190. As depicted, fuel level sensors 214, 234, and 254 may comprise a float connected to a variable resistor. Alternatively, other types of fuel level sensors may be used. Fuel tank sensors 216, 236, and 256 may include temperature, pressure and/or fuel oxygen sensors for determining temperature, pressure and/or fuel oxygen content in the fuel tanks 210, 230, and 250, respectively. Fuel oxygen content in each of the fuel tanks may also be estimated by fuel oxygen models and based on the amounts of fuel (of known fuel oxygen content) dispensed into each fuel tank. Low pressure fuel pumps 220, 240, and 260 may be configured to pressurize fuel in fuel tanks 210, 230, and 250, respectively, for delivering fuel to the high pressure pump 280 for pumping fuel to the fuel injectors of engine 110, such as example injector 166. The low pressure fuel pumps 220, 240, and 260 (also known as low pressure fuel lift pumps) may comprise multi-speed low pressure pumps for delivering fuel to the high pressure pump 280. Low pressure fuel pumps 220, 240, and 260 may deliver fuel to the high pressure pump 280 for supplying fuel to the engine 110, and for lubrication and cooling of the high pressure pump. At lower engine speeds and engine loads, when the fuel demand from the engine is lower and the high pressure pump cooling and lubrication demands are lower, the low pressure fuel pumps 220, 240, and 260 may be operated at lower speeds (e.g., lower pump rates) in order to reduce electrical load and fuel consumption. When the engine fuel demand or the high pressure pump cooling and lubrication demand is higher, the low pressure fuel pumps 220, 240, and 260 may be operated at higher speeds (e.g., higher pump rates) in order to meet the higher fuel demands.

While only a single injector 166 is shown, additional injectors are provided for each cylinder. It will be appreciated that fuel system 201 may be a return-less fuel system, a return fuel system, or various other types of fuel system. Vapors generated in fuel tanks 210, 230, and 250 may be routed to a fuel vapor canister (not shown), before being purged to the engine intake passage 142. The fuel system may further include additional components (sensors, fuel lines, valves, vacuum apparatus, and the like) coupled to the fuel vapor canister purge for fuel vapor leak detection, and for recovering fuel vapor formed in the fuel system 201. Additional fuel properties in each of the fuel tanks (210, 230, and 250) such as cetane number, aromatic content, number of C—C bonds in the fuel, fuel energy density, fuel volatility (T90) may be estimated and/or measured during fuel filling (e.g., fuel properties may be provided or transmitted to the control system 190 on board the vehicle from the fuel pumping station, or may be estimated from fuel property models residing on-board control system 190 and based on fuel properties and fuel flow rates to each fuel tank).

Three-way valve 202 may be positioned downstream from low pressure fuel pump 220 to direct higher oxygenated fuel pumped from fuel tank 210 to high pressure pump 280 for delivery to fuel rail 270 or to fuel tank 230 for fuel blending (e.g., raising the fuel oxygen content of the blended fuel in fuel tank 230). Three-way valve 204 may be positioned downstream from low pressure fuel pump 260 to direct lower oxygenated fuel pumped from fuel tank 250 to high pressure pump 280 for delivery to fuel rail 270 or to fuel tank 230 for fuel blending (e.g., lowering the fuel oxygen content of the blended fuel in fuel tank 230). Check valves 222, 242, and 262 may be positioned downstream from low pressure fuel pumps 220, 240, and 260, respectively, to prevent backflow of fuel to fuel tanks 210, 230, and 250, respectively. Furthermore, check valves 224 and 244 may be positioned between three-way valve 202 and fuel tank 230, and three-way valve 204 and fuel tank 230, respectively, to prevent backflow of fuel from fuel tank 230 upstream to three-way valves 202 and 204, respectively.

The blended fuel in fuel tank 230 may include fuel returned from the fuel system, including fuel returned from the fuel rail 270 via a first fuel return line 285 and fuel returned from the high pressure pump 280 via a second fuel return line 283. Control system 190 may actuate (e.g., adjust a valve position to a more open or a more closed position) a pressure control valve (PCV) 286 in order control fuel rail pressure. PCV 286 may be positioned at an outlet of the fuel rail 270 downstream from high pressure pump 280, or PCV 286 may be positioned at an outlet of the fuel rail downstream from the fuel rail 270 in the first fuel return line 285. Accordingly, positioning the PCV 286 at an outlet of the fuel rail 270 may include positioning the PCV 286 at the fuel rail 270, or at fuel return line 285 between the fuel rail 270 and the blend fuel tank 230. As an example, control system 190 may open pressure control valve (PCV) 286 to return fuel from the fuel rail 270 via first fuel return line 285 to fuel tank 230 to maintain or reduce fuel rail pressure. Check valve 288 in first fuel return line 285 may be positioned downstream from PCV 286 and fuel rail 270 to prevent backflow of fuel upstream to the fuel rail 270. In one example, control system 190 may open PCV 286 to lower or maintain a fuel rail pressure and may close PCV 286 to raise or maintain a fuel rail pressure. During certain conditions, the control system 190 may open PCV 286 in response to a fuel rail pressure exceeding a threshold pressure. In other examples, control system 190 may open PCV valve to more rapidly purge fuel from the fuel rail (and the high pressure pump, and the fuel line 281 between the high pressure fuel pump and the fuel rail) in response to a measured or estimated fuel oxygen content deviating from a desired fuel oxygen content. Opening PCV 286 may include adjusting PCV to a more open position, and closing PCV 286 may include adjusting PCV to a more closed position. As described in more detail with respect to FIGS. 3-6, the desired fuel oxygen content may be determined based on a deviation between an estimated or measured exhaust particulate matter level and a desired exhaust particulate matter level. The measured fuel oxygen content may comprise a fuel oxygen content downstream of fuel rail 270 within first fuel return line 285, as measured by sensor 292. Sensor 292 can include a temperature sensor, a pressure sensor, and a fuel oxygen sensor for estimating fuel temperature, fuel pressure, and fuel oxygen content, respectively within first fuel return line 285. Fuel oxygen content may also be estimated via fuel flow models, fuel blend ratios, and known fuel properties in the fuel system fuel tanks 210, 230, and 250. Although sensor 292 is positioned downstream from check valve 288 in FIG. 2, sensor 292 may be positioned elsewhere along first fuel return line 285. During engine off conditions (e.g., deceleration fuel shut-off, engine shut down, and the like) the PCV 286 may be fully closed in order to maintain a current fuel system and fuel rail pressure so that when the engine is switched on the fuel system can readily resume fuel injection.

A volume control valve (VCV) 282 may be positioned at the high pressure pump 280, specifically at an inlet to the high pressure pump 280. Positioning the VCV 282 at the inlet to the high pressure pump 280 may include positioning the VCV 282 in fuel line 289 downstream from fuel tanks 210, 230, and 250 and upstream of the high pressure pump 280, and may also include positioning the VCV 282 within the internal assembly of the high pressure pump 280 so that fuel passes through the VCV 282 within the high pressure pump 280 prior to being driven to a higher pressure. Control system 190 may actuate VCV 282, adjusting VCV 282 to a more open or a more closed position, in order to modulate the amount of fuel delivered to the high pressure pump 280, and ultimately to the fuel rail 270 via fuel line 281. Control system 190 may operate PCV 286 in conjunction with VCV 282 to control the fuel rail pressure and fuel flow through the high pressure pump 280 and fuel rail 270. For example, control system 190 may adjust PCV 286 to a more open position to maintain or reduce a fuel rail pressure, and may adjust PCV 286 to a more closed position to maintain or increase a fuel rail pressure. Furthermore, control system 190 may adjust VCV 282 to a more open position to increase a fuel flow to the high pressure pump 280 and the fuel rail 270, or may adjust VCV 282 to a more closed position to reduce fuel flow to the high pressure pump 280 and the fuel rail 270. Further still, control system 190 may adjust PCV 286 to a more open position while adjusting VCV 282 to a more open position to maintain a fuel rail pressure while increasing fuel flow to the high pressure pump 280 and the fuel rail 270. Further still, control system 190 may adjust PCV 286 to a more closed position while adjusting VCV 282 to a more closed position to maintain a fuel rail pressure while decreasing fuel flow to the high pressure pump 280 and the fuel rail 270. By controlling fuel rail pressure by adjusting the position of the PCV 286 and by controlling fuel flow to the high pressure pump 280 and the fuel rail 270 by adjusting the position of the VCV 282, the fuel flow rate delivered to the engine and engine operability can be maintained. During engine off conditions (e.g., deceleration fuel shut-off, engine shut down, and the like) the VCV 282 may be adjusted to a partially open position in order to just maintain a desired fuel system and fuel rail pressure so that when the engine is switched on the fuel system can readily resume fuel injection.

VCV 282 may further be adjusted by control system 190 to aid in controlling a fuel rail pressure. For example, adjusting VCV 282 to a more open position while maintaining a constant PCV 286 position may increase a fuel flow rate to the high pressure pump 280 and the fuel rail 270, and may raise a fuel rail pressure. Conversely, adjusting VCV 282 to a more closed position while maintaining a constant PCV 286 position may decrease a fuel flow rate to the high pressure pump 280 and the fuel rail 270, and may lower a fuel rail pressure. During conditions when a fuel rail pressure increases beyond a desired fuel rail pressure, and the PCV 286 is fully open, the VCV 282 may be adjusted to a more closed position to lower a fuel flow rate to the HP pump and the fuel rail 270 in order to lower the fuel rail pressure. Furthermore, when the fuel temperature in the first fuel return line 285 or the second fuel return line 283 increases beyond a desired fuel temperature, the VCV 282 may be adjusted to a more closed position in order to reduce a fuel temperature in the first fuel return line 285 or the second fuel return line 283.

In one example, control system 190 may open VCV 282 to increase the fuel flow delivered to the high pressure pump 280 and to purge fuel from the high pressure pump 280 in response to a measured or estimated fuel oxygen content deviating from a desired fuel oxygen content. Opening VCV 282 may also allow fuel to be purged from fuel line 289 upstream from high pressure pump 280. PCV 286 may be opened at the same time or just after VCV 282 is opened so that fuel to be purged from the fuel rail 270, high pressure pump 280, and fuel line 281 is directed to first fuel return line 285 and is returned to fuel tank 230. VCV 282 and PCV 286 may be opened or adjusted to a more open position for a duration based on the volumes of the fuel rail 270, fuel line 281, and high pressure pump 280, and the fuel flow rate. As the fuel flow rate increases, the duration that the VCV 282 and PCV 286 may be opened or adjusted to a more open position may be reduced since the time to purge the fuel rail 270, fuel line 281, and high pressure pump 280 may be reduced. The duration that the VCV 282 and PCV 286 may be opened or adjusted to a more open position may be longer for fuel systems having a fuel rail 270, high pressure pump 280, and fuel line 281 with larger volumes. Conversely, the duration that the VCV 282 and PCV 286 may be opened or adjusted to a more open position may be shorter for fuel systems having a fuel rail 270, high pressure pump 280, and fuel line 281 with smaller volumes. As described in more detail with respect to FIGS. 3-6, the desired fuel oxygen content may be determined based on a deviation between an estimated or measured exhaust particulate matter level and a desired exhaust particulate matter level. The estimated or measured fuel oxygen content may comprise a fuel oxygen content downstream of high pressure pump 280, within second fuel return line 283, as measured by sensor 294. Sensor 294 can include a temperature sensor, a pressure sensor, and a fuel oxygen sensor for estimating fuel temperature, fuel pressure, and fuel oxygen content within second fuel return line 283. Although sensor 294 is positioned downstream from check valve 284 in FIG. 2, sensor 294 may be positioned elsewhere along second fuel return line 283. The estimated or measured fuel oxygen content may also comprise an estimated fuel oxygen content based on a fuel blend ratio model, and known fuel properties in fuel tanks 210, 230, and 250.

As fuel oxygen content delivered to the engine increases, the energy content of the fuel may decrease and the volume of fuel for achieving a target engine load may increase accordingly. As such, the fuel injection system may increase a fuel injection volume (e.g., fuel injection flow rate) when the estimated or measured fuel oxygen content of fuel delivered to the engine is higher. Conversely, the fuel injection system may decrease a fuel injection volume (e.g., fuel injection flow rate) when the estimated or measured fuel oxygen content of fuel delivered to the engine is lower. Furthermore, when the fuel oxygen content delivered to the engine is higher, the control system 190 may adjust the VCV 282 to a more open position and/or may adjust the VCV 282 to a more open position for a longer duration since delivering a higher fuel injection volume to the engine may achieve a target engine load. Furthermore, when the fuel oxygen content delivered to the engine is lower, the control system 190 may adjust the VCV 282 to a less open position and/or may adjust the VCV 282 to a more open position for a shorter duration since delivering a lower fuel injection volume to the engine may achieve a target engine load.

High pressure pump 280 may also include a lubrication and cooling circuit (not shown in FIG. 2) whereby a portion of fuel delivered to the high pressure pump 280 from low pressure fuel pumps 220, 240, and 260 via fuel line 289 may be diverted to the lubrication and cooling circuit. As described above, the pump speeds of the low pressure fuel pumps 220, 240, and 260 may determine the flow rate of fuel diverted to the lubrication and cooling circuit within the high pressure pump 280. At lower low pressure pump speeds the fuel flow rate diverted to the lubrication and cooling circuit may be lower, while at higher low pressure pump speeds the fuel flow rate diverted to the lubrication and cooling circuit may be higher. Fuel diverted to the lubrication and cooling circuit within the high pressure pump 280 may be returned to the blend fuel tank 230 via second fuel return line 283. Check valve 284 in second fuel return line 283 may be positioned downstream from high pressure pump 280 to prevent backflow of fuel upstream to the high pressure pump 280. Accordingly, a main portion of fuel delivered the high pressure pump 280 may be directed through the VCV 282 to a portion of the high pressure pump 280 where it is driven to higher pressure and delivered to the fuel rail 270. The high pressure fuel may then be injected into the engine combustion chamber, or may be spilled from the PCV 286 back to the blend fuel tank 230 via first fuel return line 285, or may be spilled from the fuel injector 166 back to the blend fuel tank 230 via a third fuel return line (not shown) fluidly coupled between the fuel injector 166 to the first fuel return line 285. Furthermore a secondary portion of fuel delivered to the high pressure pump 280 may be diverted away from the VCV 282 to a lubrication and cooling circuit within the high pressure pump 280. The secondary portion of fuel may be returned to the blend fuel tank 230 via second fuel return line 283 upon exiting the high pressure pump 280. Further still, control system 190 may actuate one or more of low pressure fuel pumps 220, 240, and 260 in order to adjust a total fuel flow rate delivered to high pressure pump 280. By increasing the pump speed of low pressure fuel pumps 220, 240 and 260, the total fuel flow rate delivered to high pressure pump 280 and fuel rail 270 may be increased, and by lowering the pump speed of low pressure fuel pumps 220, 240 and 260, the total fuel flow rate delivered to high pressure pump 280 and fuel rail 270 may be decreased. In one example, the pump speed of one or more of low pressure fuel pumps 220, 240, and 260 may be increased above a threshold pump speed in order to reduce a time to purge fuel from fuel lines 289 and 281, high pressure fuel pump 282 (including the lubrication and cooling circuit), and fuel rail 270. The threshold pump speed may vary directly with a volume of the fuel lines 289 and 281, high pressure fuel pump 282 (including the lubrication and cooling circuit), and fuel rail 270. When the volume of the fuel lines 289 and 281, high pressure fuel pump 282 (including the lubrication and cooling circuit), and fuel rail 270 is higher, the threshold pump speed may be higher since more fuel needs to be pumped to purge the fuel system. In contrast, when the volume of the fuel lines 289 and 281, high pressure fuel pump 282 (including the lubrication and cooling circuit), and fuel rail 270 is lower, the threshold pump speed may be lower since less fuel needs to be pumped to purge the fuel system.

Three-way valves 202 and 204 may be actuated by control system 190 in response to engine operation conditions. For example, in response to an estimated and/or measured fuel oxygen content being less than a desired fuel oxygen content, control system 190 may position three-way valve 202 to direct higher oxygenated fuel from fuel tank 210 to high pressure pump 280. Furthermore, control system 190 may increase the pumping rate of low pressure fuel pump 220 to increase a flow of higher oxygenated fuel from fuel tank 210 to high pressure pump 280, and control system 190 may decrease the pumping rate or switch off the pumping rate of low pressure fuel pump 260 to decrease or switch off a flow of lower oxygenated fuel from fuel tank 250 to high pressure pump 280. As another example, in response to an estimated and/or measured fuel oxygen content being greater than a desired fuel oxygen content, control system 190 may position three-way valve 204 to direct lower oxygenated fuel from fuel tank 210 to high pressure pump 280. Furthermore, control system 190 may increase the pumping rate of low pressure fuel pump 260 to increase a flow of lower oxygenated fuel from fuel tank 250 to high pressure pump 280, and control system 190 may decrease the pumping rate or switch off the pumping rate of low pressure fuel pump 220 to decrease or switch off a flow of higher oxygenated fuel from fuel tank 210 to high pressure pump 280. The measured fuel oxygen content may include a fuel oxygen content in first fuel return line 285 measured by sensor 292 or a fuel oxygen content in second fuel return line 283 measured by sensor 294. In other examples the fuel oxygen content may be measured and/or estimated in the fuel rail 270 based on pumping rates of the high pressure pump 280, low pressure pumps (220, 240, and 260), and the fuel properties in fuel tanks 210, 230, and 250.

In another example, control system 190 may operate low pressure fuel pumps 220, 240, and 260, to deliver a specific fuel flow ratio to high pressure pump 280, to achieve a desired fuel oxygen content to engine 110. Fuel flow ratio may be controlled by controlling the relative pumping rates of a first fuel and a second fuel via low pressure fuel pumps 220, 240, and 260. If the desired fuel oxygen content is higher than the measured/estimated fuel oxygen content in fuel tank 230, control system 190 may pump fuel from fuel tanks 210 and 230 while shutting off low pressure fuel pump 260. Furthermore, control system 190 may set the relative pumping rates of low pressure fuel pumps 220 and 240 to deliver a fuel ratio (e.g., flow rate ratio) of the higher oxygenated fuel in fuel tank 210 and the blended fuel in fuel tank 230 based on their measured/estimated fuel contents and the desired fuel oxygen content to be delivered to the engine 110. If the desired fuel oxygen content is lower than the measured/estimated fuel oxygen content in fuel tank 230, control system 190 may pump fuel from fuel tanks 250 and 230 while shutting off low pressure fuel pump 220. Furthermore, control system 190 may set the relative pumping rates of low pressure fuel pumps 260 and 240 to deliver a fuel ratio (e.g., flow rate ratio) of the lower oxygenated fuel in fuel tank 210 and the blended fuel in fuel tank 230 based on their measured/estimated fuel contents and the desired fuel oxygen content to be delivered to the engine 110. Alternatively, a feed forward fuel ratio control strategy may include delivering a fuel ratio of a higher oxygenated fuel and a lower oxygenated fuel to the engine based on a measured or estimated fuel oxygen content in fuel tanks 210, 230, and 250. The higher oxygenated fuel and the lower oxygenated fuel may comprise the fuel in fuel tank 210 and the blended fuel in fuel tank 230 (e.g., to raise the fuel oxygen content). The higher oxygenated fuel and the lower oxygenated fuel may comprise the blended fuel in fuel tank 230 and the fuel in fuel tank 250 (e.g., to lower the fuel oxygen content). Further still, the control system 190 may increase a pump speed of one or more of low pressure fuel pumps 220, 240, and 260, while maintaining the fuel ratio, in order to increase a total fuel flow rate to more quickly purge fuel from fuel lines 289 and 281, high pressure pump 280 (including the high pressure pump lubrication and cooling circuit) and fuel rail 270. More quickly purging fuel from fuel lines 289 and 281, high pressure pump 280 and fuel rail 270 may enable the control system 190 to more quickly achieve the desired fuel oxygen content. Accordingly, control system 190 may increase a pump speed of one or more of the low pressure fuel pumps above a threshold pump speed in response to an exhaust PM level deviating from a target PM level by more than a threshold deviation, and/or in response to an estimated/measured fuel oxygen content deviating from a desired fuel oxygen content by more than a threshold deviation.

In addition to adjusting the fuel flow rates responsive to a measured exhaust PM deviating from a desired PM and/or a measured fuel oxygen content deviating from a desired fuel oxygen content, control system 190 may further adjust fuel flow rates responsive to one or more fuel levels remaining in fuel tanks 210, 230, and 250. For example, if the level of higher oxygenated fuel in fuel tank 210 is low relative to the level of lower oxygenated fuel in fuel tank 250, or relative to the level of blended fuel in fuel tank 230, control system 190 may slightly reduce the flow rate of higher oxygenated fuel being delivered to the engine. If the exhaust PM is greater than the desired PM (and/or the fuel oxygen content delivered to the engine is less than the desired fuel oxygen content), slightly reducing the flow rate of higher oxygenated fuel may slow the time for the exhaust PM to reach the desired PM (and/or the fuel oxygen content to reach the desired fuel oxygen content). As a result the exhaust PM may be slightly increased in the short term. However, by conserving the volume of higher oxygenated fuel in fuel tank 210, the risk of depleting fuel tank 210, which can cause larger increases in exhaust PM, can be reduced. Furthermore, in response to a low level of higher oxygenated fuel, the control system 190 may send a message to the operator notifying them of the low fuel level and recommending prompt refueling. Further still, to maintain vehicle drivability, the flow rate of the blended fuel from fuel tank 230 may be increased to offset the slight decrease in flow rate of the higher oxygenated fuel, thereby maintaining an equivalent total fuel flow rate and oxygenated fuel content delivered to the engine.

As a further example, if the level of lower oxygenated fuel in fuel tank 250 is low relative to the level of higher oxygenated fuel in fuel tank 210, or relative to the level of blended fuel in fuel tank 230, control system 190 may slightly reduce the flow rate of lower oxygenated fuel being delivered to the engine. If the exhaust PM is less than the desired PM (and/or the fuel oxygen content delivered to the engine is greater than the desired fuel oxygen content), slightly reducing the flow rate of lower oxygenated fuel may slow the time for the exhaust PM to reach the desired PM (and/or the fuel oxygen content to reach the desired fuel oxygen content). As a result the fuel consumption may be slightly increased in the short term and exhaust PM may be slightly reduced. However, by conserving the volume of higher oxygenated fuel in fuel tank 210, the risk of depleting fuel tank 250, can be reduced. Furthermore, in response to a low level of lower oxygenated fuel, the control system 190 may send a message to the operator notifying them of the low fuel level and recommending prompt refueling. Further still, to maintain vehicle drivability, the flow rate of the blended fuel from fuel tank 230 may be increased to offset the slight decrease in flow rate of the lower oxygenated fuel, thereby maintaining an equivalent total fuel flow rate and oxygenated fuel content delivered to the engine.

The desired fuel oxygen content may be adjusted based on various engine operating conditions, including based on the exhaust particulate matter (PM) level. As an example, the exhaust PM level may be measured by a PM sensor 173 in the exhaust system. For example, fuel oxygen content combusted in the engine may be increased responsive to a measured/estimated exhaust PM level being higher than a desired exhaust PM level, in order to reduce the exhaust PM level. Combustion of fuel with a higher oxygen content can reduce soot formation in the engine, thereby reducing exhaust PM levels. Conversely, fuel oxygen content combusted in the engine may be decreased responsive to a measured/estimated exhaust PM level being lower than a desired exhaust PM level. By lowering the oxygen content of fuel combusted in the engine, engine fuel economy may be improved while maintaining exhaust PM levels below the desired exhaust PM level. As another example, a global positioning system (GPS) on-board the control system 190 may be used to increase a desired fuel oxygen content in response to driving in a location having lower PM emissions standards, such as city centers having restrictions against vehicles exceeding certain emissions criteria.

The total fuel tank volume of fuel tanks 210, 230, and 250 may be slightly larger than a fuel tank volume in single tank fuel system to allow for a similar vehicle driving range when a portion of either the higher oxygenated fuel or a portion of the lower oxygenated fuel remains unused. However, the fuel tanks 210, 23, and 250 may be sized to reduce leftover fuel in the tanks during engine operation. If lower oxygenated fuel in fuel tank 250 or if the lower oxygenated fuel in fuel tank 250 and the blended fuel in fuel tank 230 are depleted, the higher oxygenated fuel may be used to extend the vehicle range; however, the control system 190 may deliver a notification via message center 197 warning the operator that fuel economy is sub-optimal and recommending refueling. If the higher oxygenated fuel in fuel tank 210 or if the higher oxygenated fuel in fuel tank 210 and the blended fuel in fuel tank 230 are depleted, the lower oxygenated fuel in fuel tank 250 may be used to propel the vehicle until refueling can be performed. However, the engine operation may be adjusted to maintain exhaust PM emissions below a desired exhaust PM level while sacrificing one or more of vehicle drivability, fuel economy, engine noise, and hydrocarbon emissions. Furthermore, control system 190 may display a message via message center 197 to notify the operator that fuel in one or more of fuel tanks 210 and 230 is depleted. For example, in response to depleting the higher oxygenated fuel in fuel tank 210, the engine load may be maintained below a threshold engine load, EGR may be discontinued, urea injection to the ECD 170 may be increased to lower NOx emissions resulting from combustion of lower oxygenated fuel, pilot injection of fuel may be reduced, boost pressure and fuel rail pressure may be increased, and start of injection (SOI) timing and vehicle speed capabilities may be adjusted.

Under certain conditions, the fuel tanks 210, 230, and 250 may be filled to full capacity during refueling. However, in some cases, the relative leftover fuel amounts in fuel tanks 210, 230, and 250 at refueling may be stored in the control system 190 and may be used to calculate refueling volume ratios of the higher oxygenated fuel and the lower oxygenated fuel based on average vehicle operator driving habits. By optimizing the refueling volume ratios, depleting fuel in one of the fuel tanks before depleting fuel in the other fuel tanks can be reduced. For example, fuel tanks 210 and 250 may be filled during refueling, but fuel tank 230 may be partially filled. As another example, by optimizing the refueling volume ratios, or by learning the vehicle operator driving habits, one of the fuel tanks 210 and 250 may be partially filled to reduce a risk of carrying unused fuel before the next refueling, thereby reducing a vehicle weight and reducing fuel consumption. Furthermore, during refueling at a refueling station, the control system 190 may facilitate in-pump fuel blending by sending a signal to the refueling pump with desired fuel oxygen content to be refueled; the refueling pump may accordingly provide the appropriate blend of low and high oxygen fuel for the vehicle.

As described above control system 190 may open one or more of PCV 286 positioned at the fuel rail 270 (or in first fuel return line 285 between the fuel rail 270 and the fuel tank 230) and VCV 282 positioned at the inlet to the high pressure pump 280 when adjusting the fuel oxygen content delivered to the fuel rail 270 and engine 110. Opening PCV 286 allows fuel in fuel rail 270 and in fuel line 281 (downstream of the high pressure pump 280 and upstream of fuel rail 270) to be returned via first fuel return line 285 to fuel tank 230. Opening PCV 286 thus allows fuel to be purged from the fuel rail 270 and fuel line 281. Opening VCV 282 increases the flow of fuel into high pressure pump 280 which helps to increase the purging rate of fuel from high pressure pump 280, fuel line 281, and fuel rail 270. Furthermore, the purged fuel from fuel rail 270, fuel line 281, and high pressure pump 280 may be directed to first fuel return line 285 by opening PCV 286 at the same time or immediately after opening VCV 282. Further still, fuel diverted to the lubrication and cooling circuit within high pressure pump 280 may purge the lubrication and cooling circuit prior to being directed to second fuel return line 283 and returned to blend fuel tank 230.

Opening PCV 286 to purge fuel from the fuel rail 270, high pressure fuel pump, and fuel line 281 may aid in reducing transition times for adjusting the fuel oxygen content of from a measured or estimated fuel oxygen content to a desired fuel oxygen content because fuel (of the measured or estimated fuel oxygen content) in the fuel rail 270 and fuel line 281 can be purged instead of being blended with the incoming fuel of the desired fuel oxygen content and being delivered to the engine. Similarly, opening VCV 282 to purge fuel from the high pressure fuel pump may aid in reducing transition times for adjusting the fuel oxygen content of from a measured fuel oxygen content to a desired fuel oxygen content because fuel (of the measured fuel oxygen content) in the high pressure pump 280 can be purged instead of being blended with the incoming fuel of a desired fuel oxygen content and being delivered to the engine. As an example, the measured fuel and/or estimated oxygen content may be a fuel oxygen content in first fuel return line 285 and/or second fuel return line 283. For example, the fuel oxygen content may be inferred or modeled from the air-fuel ratio and/or the Indicated Mean Effective Pressure (IMEP) as measured from an in-cylinder pressure sensor. Furthermore, the desired fuel oxygen content may be determined based on a deviation of a measured or estimated exhaust PM level from a desired exhaust PM level. Reducing transition times for adjusting the fuel oxygen content from a measured fuel oxygen content to a desired fuel oxygen content can reduce exhaust PM emissions levels since the amount of fuel, having a fuel oxygen content deviating from the desired fuel oxygen content, that is combusted in the engine is reduced.

Opening the PCV 286 may comprise adjusting a position of the PCV 286 to a more open position, and opening the VCV 282 may comprise adjusting a position of the VCV 282 to a more open position. Under certain conditions, only one of the PCV 286 and the VCV 282 may be opened. For example, when the difference between the new fuel oxygen content and the existing fuel oxygen content is smaller, only one of the PCV 286 and the VCV 282 may be opened to purge fuel. The duration for which and the amount by which the PCV 286 and/or VCV 282 are opened may be dependent on a deviation of a measured fuel oxygen content from a desired fuel oxygen content. For example, when the deviation of a measured fuel oxygen content from a desired fuel oxygen content is higher, the amount by which the PCV 286 and/or the VCV 282 are opened may be higher, and the duration for which the PCV 286 and/or the VCV 282 are opened may be longer. Conversely, when the deviation of a measured fuel oxygen content from a desired fuel oxygen content is lower, the amount by which the PCV 286 and/or the VCV 282 are opened may be lower, and the duration for which the PCV 286 and/or the VCV 282 are opened may be shorter. Further still, as described above, the VCV 282 may be adjusted to a more open position for a longer duration when the fuel oxygen content is higher (and the fuel energy content is lower) as compared to when the fuel oxygen content is lower (and the fuel energy content is higher) because a higher volume (or flow rate) of fuel may be delivered to the engine for achieving a target engine load.

Opening the PCV 286 by a larger amount and/or for a longer duration may purge a larger volume of fuel from fuel rail 270 and fuel line 281 in a shorter period of time, while opening the PCV 286 by a smaller amount and/or for a shorter duration may purge a smaller volume of fuel from fuel rail 270 and fuel line 281 in a longer period of time. Similarly, opening the VCV 282 by a larger amount and/or for a longer duration may purge a larger volume of fuel from high pressure pump 280 in a shorter period of time, while opening the VCV 282 by a smaller amount and/or for a shorter duration may purge a smaller volume of fuel from high pressure pump 280 in a longer period of time. Furthermore, the duration for which the PCV 286 is opened may be determined based on a total fuel flow rate pumped from the high pressure pump to the fuel rail 270. When the total fuel flow rate pumped from the high pressure pump 280 (and delivered from the low pressure fuel pumps 220, 240, and 260) is higher, fuel from fuel rail 270 and fuel line 281 may be purged faster when PCV 286 is open than when the total fuel flow rate pumped from the high pressure pump 280 (and delivered from the low pressure fuel pumps 220, 240, and 260) is lower. When the total fuel flow rate pumped from the high pressure pump 280 (and delivered from the low pressure fuel pumps 220, 240, and 260) is higher, fuel from high pressure pump 280 may be purged faster when VCV 282 is open than when the total fuel flow rate pumped from the high pressure pump 280 (and delivered from the low pressure fuel pumps 220, 240, and 260) is lower. Accordingly, at higher total fuel flow rates, the PCV 286 and VCV 282 may be opened for a shorter duration and/or to a less open position as compared to at lower total fuel flow rates. After purging the fuel from the fuel rail 270, fuel line 281, and high pressure pump 280, normal operation of the PCV 286 and VCV 282 may be resumed. In other words, the control system 190 may adjust VCV 282 to deliver a desired fuel flow rate to the fuel rail 270 and the engine, and may adjust PCV 286 to maintain a desired fuel rail pressure.

In some examples, the control system may open VCV 282 (including adjusting the VCV position to a more open position) and close VCV 282 (including adjusting the VCV position to a more closed position) just prior to opening PCV 286 (including adjusting the PCV position to a more open position) and closing PCV 286 (including adjusting the VCV position to a more closed position) so that the volume of fuel contained in the high pressure pump 280 may be purged. Opening and closing the PCV 286 may be performed based on controlling a fuel rail pressure. In other examples, the control system 190 may open PCV 286 just prior to opening VCV 282. In this way, opening the VCV 282 and/or opening the PCV 286 may reduce a transition time adjust a fuel oxygen content to match a desired fuel oxygen content, which can reducing exhaust PM emissions levels since a lower amount of fuel (having a fuel oxygen content deviating from the desired fuel oxygen content) is combusted in the engine.

In this manner, a vehicle system may comprise: an engine; a fuel system, including a first fuel tank, a second fuel tank, a pressure control valve (PCV) positioned between a fuel rail and a blend fuel tank and a volume control valve (VCV)

positioned between a high pressure fuel pump and the blend fuel tank; and a controller, with executable instructions to, in response to an exhaust particulate matter (PM) level deviating from a target PM level, open the VCV and the PCV to purge fuel from the high pressure fuel pump and the fuel rail to blend fuel tank, and adjust a fuel oxygen content delivered to the engine by adjusting a fuel flow rate from one of the first fuel tank, the second fuel tank, and the blend fuel tank. Additionally or alternatively, the executable instructions to adjust the fuel oxygen content delivered to the engine comprise raising the fuel oxygen content by raising a flow rate of a higher oxygenated fuel from the first fuel tank in response to the exhaust PM level increasing above the target PM level. Additionally or alternatively, the executable instructions to adjust the fuel oxygen content delivered to the engine comprise lowering the fuel oxygen content by raising a flow rate of a lower oxygenated fuel from the second fuel tank in response to the exhaust PM level decreasing below the target PM level. Additionally or alternatively, the executable instructions further comprise in response to depleting the first fuel tank, operating the engine below a threshold engine load. Additionally or alternatively, the executable instructions further comprise in response to depleting the first fuel tank, stopping engine exhaust gas recirculation.

Turning now to FIGS. 3-6, they illustrate flow charts for methods 300, 400, 500, and 600, respectively, for reducing exhaust particle emissions. Instructions for carrying out method 300 and the rest of the methods included herein may be executed by a controller, such as control system 190, based on instructions stored on a memory of the controller and in conjunction with signals received from sensors of the engine system, such as the sensors described above with reference to FIGS. 1-2. The controller may employ engine actuators of the engine system to adjust engine operation, according to the methods described below. For example, responsive to a deviation of a measured exhaust PM level from a desired PM level, control system 190 may adjust a first fuel flow and a second fuel flow from one or more of fuel tanks 210, 230, and 250, and may open one or more of PCV 286 and VCV 282.

Method 300 begins at 310 where vehicle operating conditions such as a first fuel flow rate ($Q_{fuel1}$), a second fuel flow rate ($Q_{fuel2}$), an exhaust PM level, a fuel oxygen content ($O2_{fuel}$), engine speed (rpm), vehicle speed (Vs), engine load, and the like are estimated, and/or measured. Method 300 continues at 330 where control system 190 determines if a measured PM level is greater than a desired PM level, $PM_{target}$. If the measured PM>$PM_{target}$, method 300 continues to 334 where, in response to the measured PM being greater than $PM_{target}$, control system 190 increases the total fuel oxygen flow rate to the fuel rail as shown in FIG. 4 by method 400. Method 400 begins at 410 where the control system 190 determines a desired fuel oxygen content, $O2_{fuel,target}$, based on the deviation between the measured PM and $PM_{target}$. Next, at 412, control system 190 measures and/or estimates a fuel oxygen content, $O2_{fuel}$. As described above, $O2_{fuel}$ may comprise a fuel oxygen content in the first fuel return line 285 measured via sensor 292 or may comprise a fuel oxygen content in the second fuel return line 283 measured via sensor 294. Alternatively, $O2_{fuel}$ may comprise a fuel oxygen content measured at the fuel rail 270, fuel line 281, or at another location downstream from high pressure pump 280.

Furthermore, $O2_{fuel}$ may comprise a composite fuel oxygen content derived from one or more fuel oxygen measurements in the fuel system. In some examples, the measured PM and $PM_{target}$ may comprise a measured rate of change of PM level in the exhaust and a desired rate of change of PM, respectively. Thus, PM>$PM_{target}$ may correspond to a measured rate of change in PM being greater than the desired rate of change in PM, $PM_{target}$. Further still, fuel oxygen content may be estimated from modeling blend ratios of fuel flow rates from fuel tanks 210, 230, and 250, and known fuel properties.

At 420, control system 190 determines if $O2_{fuel}$<$O2_{fuel,target}$. If $O2_{fuel}$<$O2_{fuel,target}$, method 400 continues at 430 where control system 190 increases a flow of higher oxygenated fuel flow from a first fuel tank (e.g., fuel tank 210) relative to the flow of blended fuel from blend fuel tank 230. For example, control system 190 may increase a pumping rate of low pressure fuel pump 220 relative to a pumping rate of low pressure fuel pump 240, and position three-way valve 202 to direct higher oxygen fuel from fuel tank 210 to high pressure pump 280. At 434, control system 190 may adjust flow of blended fuel from blend fuel tank (e.g., fuel tank 230). As described above, the flow rate of fuel from fuel tank 230 may be balanced with the flow rate of higher oxygenated fuel from fuel tank 210 according to a desired fuel (flow rate) ratio such that a fuel oxygen content of the fuel delivered to high pressure pump matches the desired fuel oxygen content. The fuel oxygen content in fuel tank 210 and 230 may be measured (e.g., via sensors 216 and 236, respectively) and/or estimated or modeled using fuel, fuel tank refueling flow rates, fuel return flow rates via first and second fuel return lines 285 and 283, and other fuel data. At 436, control system 190 may decrease the flow of lower oxygenated fuel from the second fuel tank (e.g., fuel tank 250) relative to the flow of blended fuel from blend fuel tank 230 to further aid in increasing the fuel oxygen content. Decreasing the flow of lower oxygenated fuel from fuel tank 250 relative to the flow of blended fuel from blend fuel tank 230 includes stopping the flow of lower oxygenated fuel from fuel tank 250. For example, control system 190 may shut off low pressure fuel pump 260.

At 437, control system 190 may adjust a total fuel flow rate to the high pressure pump by adjusting low pressure fuel pumps 220, 240, and 260, while maintaining the relative fuel flow rate ratios from fuel tanks 210, 230, and 250. As described above, the control system 190 may increase the total fuel flow rate to the high pressure pump 280 by increasing the pump speeds of low pressure fuel pumps 220, 240, and 260, while maintaining the relative fuel flow ratios from each of the low pressure fuel pumps, in response to a deviation in the measured PM from a desired PM (or a deviation in the measured fuel oxygen content from a desired fuel oxygen content). Increasing the total fuel flow rate may aid in reducing a transition time from a from a measured PM to a desired PM (or from a measure fuel oxygen content to a desired fuel oxygen content) by more quickly purging fuel from the fuel line 289, high pressure pump 280, fuel line 281, and fuel rail 270. Control system 190 may further increase the pump speeds of low pressure fuel pumps 220, 240, and 260, while maintaining the relative fuel flow ratios from each of the low pressure fuel pumps, in response to a higher lubrication and cooling demand and/or a higher engine fuel demand (e.g., higher engine loads).

Next at 438, control system 190 may open one or more of the VCV 282 and the PCV 286 to purge the fuel system components from the high pressure pump downstream to the fuel rail. Opening one or more of the VCV 282 and the PCV 286 may comprise executing the method 600 of FIG. 6. Method 600 begins at 610 where control system 190 may adjust the VCV 282 to a more open position, including adjusting VCV 282 to a full open position, in order to purge the fuel in high pressure pump 280, fuel line 281, and fuel rail 270. Adjusting VCV 282 to a more open position, including fully opening the VCV 282, may increase a fuel flow rate into and may reduce a time to purge the high pressure pump 280, fuel line 281, and fuel rail 270. At 614 the control system 190 may adjust the PCV position to maintain a desired fuel rail pressure. Adjusting the PCV position may be at least partially responsive to fully opening the VCV 282 (or adjusting VCV 282 to a more open position) in order to maintain the desired fuel rail pressure. For example, in order to maintain a desired fuel rail pressure, control system 190 may adjust PCV 286 to a more open position responsive to fully opening the VCV. In some examples, adjusting PCV 286 to a more open position may comprise fully opening PCV 286 in order to maintain a desired fuel rail pressure. Furthermore, Next, at 620 control system 190 may determine a VCV opening duration based on a total fuel flow rate to the fuel rail 270. The total fuel flow rate to the fuel rail 270 may be calculated from a sum of the pumping rates of the low pressure fuel pumps 220, 240, and 260 when the three-way valves 202 and 204 are positioned to direct fuel flow from fuel tanks 210 and 250, respectively, to the high pressure pump 280. When the three-way valve 202 is positioned to direct fuel flow from fuel tank 210 to fuel tank 230, the total fuel flow rate to the fuel rail may be calculated from the sum of the pumping rates of the low pressure fuel pumps 240 and 260. When the three-way valve 204 is positioned to direct fuel flow from fuel tank 250 to fuel tank 230, the total fuel flow rate to the fuel rail may be calculated from the sum of the pumping rates of the low pressure fuel pumps 220 and 240. The VCV opening duration may be higher when the total fuel rate to the fuel rail is lower since the period of time to purge fuel from the high pressure pump 280, fuel line 281, and fuel rail 270 may be longer. The VCV opening duration may be lower when the total fuel rate to the fuel rail is higher since the period of time to purge fuel from the high pressure pump 280, fuel line 281, and fuel rail 270 may be shorter. At 630, the control system may determine if the VCV opening duration determined at 620, since adjusting VCV to the full open position at 610, has been exceeded.

If the VCV opening duration is not exceeded at 630, method 600 continues at 634 where control system 190 may determine if the fuel rail pressure, $P_{fuelrail}$, is greater than a target fuel rail pressure, $P_{fuelrail,target}$, and if the PCV is fully open. The target fuel rail pressure may correspond to a fuel rail pressure suitable for reliably injecting fuel into the engine to maintain engine operability and to reduce engine noise, vibration, and harshness. If $P_{fuelrail} > P_{fuelrail,target}$ and the PCV is fully open at 634, then fuel rail pressure can not be maintained at $P_{fuelrail,target}$ by adjusting PCV. Accordingly, at 636, the control system 190 may adjust the VCV position from fully open to a less open position (e.g., a more closed position) in response to a fuel rail pressure increasing above a target fuel rail pressure while the PCV is fully open. In this way, the fuel flow rate entering the high pressure pump 280, fuel line 281, and fuel rail 270 may be reduced, while preserving the fuel oxygen content, thereby lowering the fuel rail pressure.

Returning to 634, if $P_{fuelrail}$ is not greater than $P_{fuelrail,target}$ or if PCV is not fully open, then method 600 continues at 638 where the control system 190 determines if a fuel temperature in the first fuel return line 285, $T_{fuelreturn}$, is greater than a threshold fuel temperature, $T_{fuelreturn,TH}$. The threshold fuel return temperature may correspond to a fuel temperature above which fuel vaporization risk is higher. Accordingly, maintaining $T_{fuelreturn} < T_{fuelreturn,TH}$ may reduce a risk of fuel vaporization. In another example, $T_{fuelreturn,TH}$ may correspond to a fuel temperature above which a fuel cooling device capacity may be exceeded resulting in one or more fuel tank temperatures to exceed a fuel tank temperature threshold (e.g., the fuel tank temperature threshold may correspond to a fuel vaporization temperature). In another example, $T_{fuelreturn,TH}$ may correspond to a fuel temperature above which degradation of fuel additives is increased. Accordingly, method 600 continues from 638 at 636 where the VCV position may be adjusted from a fully open position (or a more open position) to a less open position (e.g., a more closed position) in response to $T_{fuelreturn}$ in first fuel return line 285 increasing above a threshold fuel temperature. Returning to 638, if $T_{fuelreturn}$ is not greater than $T_{fuelreturn,TH}$, or following 636, method 600 continues at 630, where the control system 190 again evaluates if the VCV opening duration has been exceeded. Returning to 630, if the VCV opening duration has been exceeded, method 600 continues at 640 where the control system returns the VCV and the PCV to their original more closed positions prior to executing method 600. Alternatively, control system 190 may adjust the position of the VCV to maintain $O2_{fuel}$ at $O2_{fuel,target}$, and may adjust the position of the PCV to maintain the fuel rail pressure at a desired pressure. After 640, method 600 returns to method 400 after 438 where method 400 ends, returning to method 300 after 334, where method 300 ends.

Returning to method 400 at 420, if $O2_{fuel}$ is not less than $O2_{fuel,target}$, $O2_{fuel}$ has reached the $O2_{fuel,target}$ and control system 190 maintains the current fuel oxygen content and resumes normal engine and fuel system operation at 440. In other words, the control system 190 may adjust VCV 282 to deliver a desired fuel flow rate to the fuel rail 270 and the engine, and may adjust PCV 286 to maintain a desired fuel rail pressure. In another example, the PCV may be adjusted by the control system 190 to a more closed position, including a fully closed position, to reduce an amount of fuel leakage from the fuel rail, and the control system 190 may adjust the VCV position to achieve the desired fuel rail pressure. As discussed above, fuel injection system energizing time and levels may be increased when $O2_{fuel}$ is higher to compensate for the lower fuel energy content as compared when $O2_{fuel}$ is lower. When the fuel energy content is lower a larger volume of fuel may be injected to the engine to achieve the same engine load. As such, VCV 282 may be maintained at a more open position for a longer duration to accommodate the larger volume of fuel delivered to the engine for a given engine load. After 440, method 400 ends, and returns to method 300 after 334, where method 300 ends. Returning to method 300 at 330, if the measured PM is not greater than $PM_{target}$, method 300 continues at 340 where control system 190 determines if the measured and/or estimated $PM < PM_{target}$. If the measured $PM < PM_{target}$, method 300 continues at 344 where control system 190 decreases a total fuel oxygen flow rate to the fuel rail 270, as shown by method 500 of FIG. 5.

Method 500 begins at 510 where the control system 190 determines a desired fuel oxygen content, $O2_{fuel,target}$ based on the deviation between the measured PM and $PM_{target}$. Next, at 512, control system 190 measures and/or estimates a fuel oxygen content, $O2_{fuel}$. As described above, $O2_{fuel}$ may comprise a fuel oxygen content in the first fuel return line 285 measured via sensor 292 or may comprise a fuel oxygen content in the second fuel return line 283 measured via sensor 294. Alternatively, $O2_{fuel}$ may comprise a fuel oxygen content measured at the fuel rail 270, fuel line 281, or at another location downstream from high pressure pump 280. Furthermore, $O2_{fuel}$ may comprise a composite fuel oxygen content derived from one or more fuel oxygen measurements in the fuel system. In some examples, the measured PM and $PM_{target}$ may comprise a measured rate of change of PM level in the exhaust and a desired rate of change of PM, respectively. Thus, PM<$PM_{target}$ may correspond to a measured rate of change in PM being less than the desired rate of change in PM, $PM_{target}$. Further still, fuel oxygen content may be estimated from modeling blend ratios of fuel flow rates from fuel tanks 210, 230, and 250, and known fuel properties.

At 520, control system 190 determines if $O2_{fuel}$>$O2_{fuel,target}$. If $O2_{fuel}$>$O2_{fuel,target}$, method 500 continues at 530 where control system 190 increases a flow of lower oxygenated fuel flow from a first fuel tank (e.g., fuel tank 250) relative to the flow of blended fuel from blend fuel tank 230. For example, control system 190 may increase a pumping rate of low pressure fuel pump 260 relative to a pumping rate of low pressure fuel pump 240, and position three-way valve 204 to direct lower oxygen fuel from fuel tank 250 to high pressure pump 280. At 534, control system 190 may adjust flow of blended fuel from blend fuel tank (e.g., fuel tank 230). As described above, the flow rate of fuel from fuel tank 230 may be balanced with the flow rate of higher oxygenated fuel from fuel tank 210 according to a desired fuel (flow rate) ratio such that a fuel oxygen content of the fuel delivered to high pressure pump matches the desired fuel oxygen content. The fuel oxygen content in fuel tank 250 and 230 may be measured (e.g., via sensors 256 and 236, respectively) and/or estimated or modeled using fuel, fuel tank refueling flow rates, fuel return flow rates via first and second fuel return lines 285 and 283, and other fuel data. At 536, control system 190 may decrease the flow of higher oxygenated fuel from a second fuel tank (e.g., fuel tank 210) relative to the flow of blended fuel from blend fuel tank 230 to further aid in increasing the fuel oxygen content. Decreasing the flow of higher oxygenated fuel from fuel tank 210 relative to the flow of blended fuel from blend fuel tank 230 includes stopping the flow of higher oxygenated fuel from fuel tank 210. For example, control system 190 may shut off low pressure fuel pump 220.

At 537, control system 190 may adjust a total fuel flow rate to the high pressure pump by adjusting low pressure fuel pumps 220, 240, and 260, while maintaining the relative fuel flow rate ratios from fuel tanks 210, 230, and 250. As described above, the control system 190 may increase the total fuel flow rate to the high pressure pump 280 by increasing the pump speeds of low pressure fuel pumps 220, 240, and 260, while maintaining the relative fuel flow ratios from each of the low pressure fuel pumps, in response to a deviation in the measured PM from a desired PM (or a deviation in the measured fuel oxygen content from a desired fuel oxygen content). Increasing the total fuel flow rate may aid in reducing a transition time from a from a measured PM to a desired PM (or from a measure fuel oxygen content to a desired fuel oxygen content) by more quickly purging fuel from the fuel line 289, high pressure pump 280, fuel line 281, and fuel rail 270. Control system 190 may further increase the pump speeds of low pressure fuel pumps 220, 240, and 260, while maintaining the relative fuel flow ratios from each of the low pressure fuel pumps, in response to a higher lubrication and cooling demand and/or a higher engine fuel demand (e.g., higher engine loads).

Next at 538, control system 190 may open one or more of the VCV 282 and the PCV 286 to purge the fuel system components from the high pressure pump downstream to the fuel rail. Opening one or more of the VCV 282 and the PCV 286 may comprise executing the method 600 of FIG. 6 (as described above). After executing method 600 or method 652, control system 190 returns to executing method 500 after 538 where method 500 ends, returning to method 300 after 344, where method 300 ends. Returning to method 500 at 520, if $O2_{fuel}$ is not greater than $O2_{fuel,target}$, $O2_{fuel}$ has reached the $O2_{fuel,target}$ and control system 190 maintains the current fuel oxygen content and resumes normal engine and fuel system operation at 540. In other words, the control system 190 may adjust VCV 282 to deliver a desired fuel flow rate to the fuel rail 270 and the engine, and may adjust PCV 286 to maintain a desired fuel rail pressure. In another example, the PCV may be adjusted by the control system 190 to a more closed position, including a fully closed position, to reduce an amount of fuel leakage from the fuel rail, and the control system 190 may adjust the VCV position to achieve the desired fuel rail pressure. As discussed above, fuel injection system energizing time and levels may be increased when $O2_{fuel}$ is higher to compensate for the lower fuel energy content as compared when $O2_{fuel}$ is lower. When the fuel energy content is lower a larger volume of fuel may be injected to the engine to achieve the same engine load. As such, VCV 282 may be maintained at a more open position for a longer duration to accommodate the larger volume of fuel delivered to the engine for a given engine load. After 540, method 500 ends, and returns to method 300 after 344, where method 300 ends. Returning to method 300 at 340, if the measured PM is not less than $PM_{target}$, then the exhaust PM level matches the desired PM level, and method 300 continues at 350 where the control system 190 maintains the current fuel oxygen content and resumes normal engine and fuel system operation. In other words, the control system 190 may adjust VCV 282 to deliver a desired fuel flow rate to the fuel rail 270 and the engine, and may adjust PCV 286 to maintain a desired fuel rail pressure. In another example, the PCV may be adjusted by the control system 190 to a more closed position, including a fully closed position, to reduce an amount of fuel leakage from the fuel rail, and the control system 190 may adjust the VCV position to achieve the desired fuel rail pressure. As discussed above, fuel injection system energizing time and levels may be increased when $O2_{fuel}$ is higher to compensate for the lower fuel energy content as compared when $O2_{fuel}$ is lower. When the fuel energy content is lower a larger volume of fuel may be injected to the engine to achieve the same engine load. As such, VCV 282 may be maintained at a more open position for a longer duration to accommodate the larger volume of fuel delivered to the engine for a given engine load. After 540, method 500 ends, and returns to method 300 after 344, where method 300 ends. Returning to method 300 at 340, if the measured PM is not less than $PM_{target}$, then the exhaust PM level matches the desired PM level, and method 300 continues at 350 where the control system 190 maintains the current fuel oxygen content and resumes normal engine and fuel system operation.

In this manner, a method may comprise: positioning a pressure control valve (PCV) at an outlet of a fuel rail; positioning a volume control valve (VCV) at an inlet of a high pressure pump; and in response to an exhaust particulate matter (PM) level deviating from a target PM level, adjusting a fuel ratio of a first fuel and a second fuel delivered to an engine, and opening one of the PCV and the VCV. Additionally or alternatively, the first fuel comprises a higher oxygenated fuel and the second fuel comprises a lower oxygenated fuel. Additionally or alternatively, positioning the VCV at an inlet to the high pressure fuel pump comprises positioning the VCV within an internal assembly of the high pressure fuel pump. Additionally or alternatively, adjusting the fuel ratio comprises raising a fuel oxygen flow rate to the engine in response to the exhaust PM level increasing above the target PM level, and lowering a fuel oxygen flow rate to the engine in response to the exhaust PM level decreasing below the target PM level. Additionally or alternatively, the method may comprise opening the PCV and the VCV in response to the exhaust PM level deviating from the target PM level. Additionally or alternatively, opening the VCV comprises fully opening the VCV. Additionally or alternatively, opening and the VCV comprises opening the VCV from a more closed position for a first duration before returning the VCV to the more closed position, and the first duration comprises a duration for purging fuel from the high pressure pump and the fuel rail. Additionally or alternatively, opening the PCV comprises adjusting the PCV position to a more open position to maintain a fuel rail pressure at a desired fuel rail pressure. Additionally or alternatively, the first duration increases as a total fuel flow rate to the engine decreases, and the first duration decreases as the total fuel flow rate to the engine increases.

In this manner, a method for an engine may comprise: estimating a fuel oxygen content of fuel delivered to the engine; and in response to the fuel oxygen content deviating from a target fuel oxygen content, adjusting a flow of a first higher oxygenated fuel from a first fuel tank and a flow of a second lower oxygenated fuel from a second fuel tank to a fuel rail of the engine, and opening one of a pressure control valve (PCV) and a volume control valve (VCV), wherein the PCV is positioned at an outlet of a fuel rail and the VCV is positioned at an inlet of a high pressure fuel pump. Additionally or alternatively, adjusting the flow of the first higher oxygenated fuel and the second lower oxygenated fuel is based on an estimated amount of the first higher oxygenated fuel in the first fuel tank and an estimated amount of the second lower oxygenated fuel in the second fuel tank.

Additionally or alternatively, the target fuel oxygen content is determined based on a measured exhaust particulate matter (PM) level. Additionally or alternatively, the fuel oxygen content comprises a fuel oxygen content determined between the VCV and the high pressure fuel pump. Additionally or alternatively, the fuel oxygen content comprises a fuel oxygen content determined between the PCV and the high pressure fuel pump. Additionally or alternatively, opening the PCV and the VCV comprise adjusting a position of the PCV to a more open PCV position and adjusting the VCV to a more open VCV position based on the deviation of the fuel oxygen content form the target fuel oxygen content.

Turning now to FIG. 7, it illustrates a timeline 700 for operating an engine and a fuel system according to the method shown in FIGS. 3-6 for reducing exhaust particle emissions. Timeline 700 includes trend lines for exhaust PM 710, measured $O2_{fuel}$ 720, flow rate of a higher oxygenated fuel, $Q_{fuel1}$ 730, flow rate of a lower oxygenated fuel, $Q_{fuel2}$ 734, flow rate of a blended fuel, $Q_{fuel3}$ 736, VCV position 740, PCV position 750, engine load 760, EGR status 770, fuel level of higher oxygenated fuel, fuel1, in fuel tank 1, $Level_{fuel1}$ 780, fuel rail pressure 790, and PM event status 786. Also shown are the desired PM level, $PM_{target}$ 712, desired fuel oxygen content, $O2_{fuel,target}$ 722, threshold engine load, $Load_{TH}$ 762, threshold tank level, $Level_{TH}$ 782, and desired fuel rail pressure 792. PM event status 786 being ON may represent engine operation conditions under which a higher level of PM is generated and PM event status 786 being OFF may represent engine operation conditions under which a lower level of PM is generated. Non-limiting examples of engine operation conditions that can generate a higher level of PM (and where PM event status may be ON) include one or more of the engine cylinders being deactivated, wherein the load of operational engine cylinders is high, but the mass flow through an exhaust turbine coupled to a turbocharger compressor is low causing low boost pressure. A further non-limiting example includes the engine operating under rich air-fuel conditions for regeneration of an LNT catalyst or for desulfurization (DeSOx). As another non-limiting example, the engine may be employing aggressive aftertreatment methods that increase PM generation, including one or more of early exhaust valve opening, internal EGR, and intake heating. For engine systems including a DPF, another non-limiting example includes operating the engine during a DPF regeneration. Non-event based engine operation may also cause more gradual changes in PM levels. For example, PM levels can increase and decrease with increasing and decreasing engine load, respectively. Furthermore, PM levels can increase and decrease with combustion of richer and leaner fuel combustion conditions.

Prior to time t1, the measured PM matches $PM_{target}$, $O2_{fuel}$ matches $O2_{fuel,target}$, the VCV and PCV are in more closed positions, EGR is ON, and $Level_{fuel1}$ is high. At time t1, the measured PM increases above the desired PM, $PM_{target}$, in response to a PM event status 786 changing from OFF to ON. In particular, the increase in the measured PM at time t1 may be responsive to engine operation under conditions which are conducive to generating higher levels of PM. For example, one or more of the cylinders may be deactivated, wherein the load of operational cylinders is high, but the mass flow through an exhaust turbine coupled to a turbocharger compressor is low causing low boost pressure. As another example, the engine may be operating under rich air-fuel conditions for regeneration of an LNT catalyst or for desulfurization (DeSOx). As another example, the engine may be employing aggressive aftertreatment methods that increase PM generation, including one or more of early exhaust valve opening, internal EGR, and intake heating. For engine systems including a DPF, higher levels of PM may occur during DPF regeneration. The increase in PM at time t1 may further (at least partially) be due to the sudden increase in engine load 760 at time t1.

PM may be measured and/or estimated in the exhaust passage 148 upstream or downstream from ECD 170. In response to the deviation of measured PM from $PM_{target}$, control system 190 raises $O2_{fuel,target}$, because increasing the fuel oxygen content can reduce soot generation from fuel combustion in the engine, thereby reducing PM emissions. Control system 190 measures the current fuel oxygen content, $O2_{fuel}$. $O2_{fuel}$ may be measured and/or estimated in the fuel system downstream from high pressure pump 280, such as in first fuel return line 285, second fuel return line 283, fuel rail 270, or fuel line 281. In response to the deviation of $O2_{fuel}$ from $O2_{fuel,target}$, the control system 190 adjusts fuel flow rates to raise the fuel oxygen content $O2_{fuel}$ to match $O2_{fuel,target}$. In particular, control system 190 raises the pumping rate of the low pressure fuel pump 220 to increase the flow rate of the higher oxygenated fuel, $Q_{fuel1}$ 730, relative to the blended fuel flow rate to high pressure pump 280. At time t1, control system 190 also slightly increases the pumping rate of low pressure fuel pump 240 to increase the flow rate of the blended fuel, $Q_{fuel3}$ 736, to balance the increase in $Q_{fuel1}$ and the provide the desired fuel ratio (containing the desired fuel oxygen content $O2_{fuel,target}$) to high pressure pump 280. At time t1, control system also decreases the pumping rate of low pressure fuel pump 260 to decrease (or shut off) the flow rate of the lower oxygenated fuel, $Q_{fuel2}$ 734, relative the blended fuel flow rate.

In order to reduce the time to transition to the new desired $O2_{fuel,target}$, in response to the deviation of measured PM from $PM_{target}$, and in response to $O2_{fuel}$ deviating from $O2_{fuel,target}$ at time t1, control system 190 may also open one or more of the VCV and the PCV. Opening the VCV can include adjusting the VCV position 740 to a more open position (indicated by the arrow 744) for a VCV opening duration (indicated by arrow 745). The VCV opening duration may correspond to a time to purge fuel lines 281 and 289, high pressure pump 280, and fuel rail 270. VCV opening duration may increase with decreasing total fuel flow rate and may decrease with increasing total fuel flow rate. In one example, adjusting VCV position 740 to a more open position includes fully opening VCV 282. In response to opening the VCV, the measured $O2_{fuel}$ begins to increase after time t1. Furthermore, in response to the increase in $O2_{fuel}$, the measured PM begins decreasing after time t1. Also in response to opening the VCV at time t1, the fuel rail pressure 790 increases above the desired fuel rail pressure 792.

In the example of timeline 700, the PCV is also opened in response to $O2_{fuel}$ deviating from $O2_{fuel,target}$ at time t1 in order to return the fuel rail pressure 790 to the desired fuel rail pressure 792. In other examples, the PCV may be opened just after time t1, in response to the VCV opening at time t1, to maintain fuel rail pressure at the desired pressure. In other examples, the PCV may be opened just prior to time t1, in anticipation of VCV opening in response to a PM event status switching ON. Opening the PCV can include adjusting the PCV position 750 to a more open position (indicated by the arrow 754) for a PCV opening duration (indicated by arrow 755). The PCV opening duration may be slightly greater than, slightly less than, or equivalent to the VCV opening duration. In response to opening the PCV at time t1, the fuel rail pressure 790 returns to the desired fuel rail pressure 792. Control system 190 maintains the opening of PCV from time t1 until time t1b in order to maintain the fuel rail pressure 790 and the desired fuel rail pressure 792 while the VCV position is open. At time t1a, the PM event status switches to OFF, indicating that the engine operating conditions generating higher PM levels have terminated. For example, the control system 190 may cease deactivation of one or more engine cylinders, LNT or DPF regeneration may be completed, DeSox methods may be completed, aggressive aftertreatment methods may be completed, the engine load may be reduced from a higher load, and the like.

At time t1b, after the VCV opening duration has ended, the VCV position 740 and the PCV position 750 are returned to their more closed positions (their positions prior to time t1) since the fuel (with the previous measured fuel oxygen content deviating from the desired fuel oxygen content) in high pressure pump 280, fuel lines 281 and 289, and fuel rail 270 has been purged. In response to purging the fuel from high pressure pump 280, fuel lines 281 and 289, and fuel rail 270 at time t1b, the rate of increase in the measured $O2_{fuel}$ increases again. Furthermore, at time t1b, the measured PM begins decreasing at a higher rate in response to the faster increase in $O2_{fuel}$. Further still, at time t1b, in response to the decrease in $Level_{fuel1}$, control system 190 may slightly lower $Q_{fuel1}$ 730 to reduce a risk of depleting the higher oxygenated fuel in fuel tank 210 prematurely as compared to the lower oxygenated fuel in fuel tank 250 or the blended fuel in blend fuel tank 230. Control system 190 may also simultaneously increase $Q_{fuel3}$ 736 at t1b to maintain a total fuel flow rate delivered to the engine.

Once the fuel rail 270, fuel line 281, and high pressure pump 280 have been purged at time t1b, the measured $O2_{fuel}$ quickly reaches $O2_{fuel,target}$. The measured PM reaches $PM_{target}$ after $O2_{fuel}$ reaches $O2_{fuel,target}$ because the volume of exhaust in the exhaust passage is large and changes in the exhaust PM level resulting from fuel combustion changes may be delayed as they percolate through the entire exhaust passage. At time t2, in response to measured PM matching $PM_{target}$ and $O2_{fuel}$ matching $O2_{fuel,target}$, control system 190 maintains current engine and fuel system operating conditions relating to PM reduction. From time t1 to time t2, $Level_{fuel1}$ is shown steadily decreasing as the higher oxygenated fuel, fuel1, is consumed from fuel tank 210.

Prior to a later time t3, the measured PM matches $PM_{target}$, $O2_{fuel}$ matches $O2_{fuel,target}$, the VCV2 and PCV are in more closed positions, EGR is ON, and $Level_{fuel1}$ is low but greater than $Level_{TH}$. At time t3, the measured PM decreases below the desired PM, $PM_{target}$, in response to a PM event status 786 changing from ON to OFF. In particular, the decrease in the measured PM at time t1 may be responsive to ceasing of engine operation under conditions which are conducive to generating higher levels of PM. The decrease in PM at time t3 may further (at least partially) be due to a sudden decrease in engine load 760 at time t3. As described above, the measured PM may be measured and/or estimated in the exhaust passage 148 upstream or downstream from ECD 170. In response to the deviation of measured PM from $PM_{target}$, control system 190 reduces $O2_{fuel,target}$, because reducing the fuel oxygen content may increase PM emissions, but may decrease fuel consumption. Control system 190 determines the current $O2_{fuel}$, which may be measured and/or estimated in the fuel system downstream from high pressure pump 280, such as in first fuel return line 285, second fuel return line 283, fuel rail 270, or fuel line 281. In response to the deviation of $O2_{fuel}$ from $O2_{fuel,target}$, the control system 190 adjusts fuel flow rates to reduce the fuel oxygen content $O2_{fuel}$ to match $O2_{fuel,target}$. In particular, control system 190 raises the pumping rate of the low pressure pump 260 to increase the flow rate of the lower oxygenated fuel, $Q_{fuel2}$ 734, to high pressure pump 280. At time t3, control system 190 also increases the pumping rate of low pressure pump 240 to increase the flow rate of the blended fuel, $Q_{fuel3}$ 736, to balance the increase in $Q_{fuel1}$ and the provide the desired fuel ratio (containing the desired fuel oxygen content $O2_{fuel,target}$) to high pressure pump 280. At time t3, control system also decreases the pumping rate of low pressure fuel pump 220 to decrease (or shut off) the flow rate of the higher oxygenated fuel, $Q_{fuel1}$ 730.

In order to reduce the time to transition to the new desired $O2_{fuel,target}$, in response to the deviation of measured PM from $PM_{target}$, and in response to $O2_{fuel}$ deviating from $O2_{fuel,target}$ at time t3, control system 190 may also open one or more of the VCV and the PCV. Opening the VCV can include adjusting the VCV position 740 to a more open position (indicated by the arrow 746) for a VCV opening duration (indicated by arrow 747). The VCV opening duration may correspond to a time to purge fuel lines 281 and 289, high pressure pump 280, and fuel rail 270. VCV opening duration may increase with decreasing total fuel flow rate and may decrease with increasing total fuel flow rate. In one example, adjusting VCV position 740 to a more open position includes fully opening VCV 282. In response to opening the VCV, the measured $O2_{fuel}$ begins to decrease after time t3. Furthermore, in response to the increase in $O2_{fuel}$, the measured PM begins increasing after time t3. Also in response to opening the VCV at time t1, the fuel rail pressure 790 increases above the desired fuel rail pressure 792.

In the example of timeline 700, the PCV is also opened in response to $O2_{fuel}$ deviating from $O2_{fuel,target}$ at time t3 in order to return the fuel rail pressure 790 to the desired fuel rail pressure 792. In other examples, the PCV may be opened just after time t3, in response to the VCV opening at time t3, to maintain fuel rail pressure at the desired pressure. In other examples, the PCV may be opened just prior to time t3, in anticipation of VCV opening in response to a PM event status switching ON. Opening the PCV can include adjusting the PCV position 750 to a more open position (indicated by the arrow 756) for a PCV opening duration (indicated by arrow 757). The PCV opening duration may be slightly greater than, slightly less than, or equivalent to the VCV opening duration.

In response to opening the PCV at time t3, the fuel rail pressure 790 returns to the desired fuel rail pressure 792. Control system 190 maintains the opening of PCV from time t3 until time t3b in order to maintain the fuel rail pressure 790 and the desired fuel rail pressure 792 while the VCV position is open. At time t3b, after the VCV opening duration has ended, the VCV position 740 and the PCV position 750 are returned to their more closed positions (their positions prior to time t3) since the fuel (with the previous measured fuel oxygen content deviating from the desired fuel oxygen content) in high pressure pump 280, fuel lines 281 and 289, and fuel rail 270 has been purged. In response to purging the fuel from high pressure pump 280, fuel lines 281 and 289, and fuel rail 270 at time t3b, the rate of decrease in the measured $O2_{fuel}$ increases again. Furthermore, at time t3b, the measured PM begins increasing at a higher rate in response to the faster decrease in $O2_{fuel}$.

The VCV opening duration 747 and the PCV opening duration 757 may be shorter than the VCV opening duration 745 and the PCV opening duration 755, respectively, because the deviations of PM from $PM_{target}$ and $O2_{fuel}$ from $O2_{fuel,target}$ are smaller at t3 than those at t1. Similarly the magnitudes of the VCV opening adjustment 746 and the PCV opening adjustment 756 may be smaller than the magnitudes to of the VCV opening adjustment 744 and the PCV opening adjustment 754, respectively, because the deviations of PM from $PM_{target}$ and $O2_{fuel}$ from $O2_{fuel,target}$ are smaller at t3 than those at t1. As described previously, the VCV opening duration and the PCV opening duration may further depend on the total fuel flow rate delivered to the high pressure pump: when the total fuel flow rate is higher, the VCV opening duration and the PCV opening duration may be lower since the fuel purging rate is faster; when the total fuel flow rate is lower, the VCV opening duration and the PCV opening duration may be higher since the purging rate is slower. For example, between time t1 to time t1b, the total fuel flow rate may be increased (while preserving the fuel oxygen content or fuel ratio of each fuel type) by increasing a pump speed of low pressure fuel pumps 220, 240, and 260. By increasing the total fuel flow rate, the time to purge fuel from the fuel lines 281 and 289, fuel rail 270, and high pressure pump 280 can be reduced; accordingly the VCV opening duration 745 and the PCV opening duration 755 may be reduced. Similarly, the VCV opening duration 747 and the PCV opening duration 757 may be reduced by increasing the pump speed of low pressure fuel pumps 220, 240, and 260 to increase the total fuel flow rate and decrease the time to purge fuel from the fuel lines 281 and 289, fuel rail 270, and high pressure pump 280.

At time t3b, the PCV position is adjusted back to the more closed position. In response to opening the PCV (and after purging fuel from the fuel line 281 and the fuel rail 270), at time t3b, the rate of decrease in the measured $O2_{fuel}$ rises again. Furthermore, at time t3b, the measured PM begins increasing at a faster rate in response to the faster decrease in $O2_{fuel}$. Once the fuel rail 270, fuel line 281, and high pressure pump 280 have been purged at time t3b, the measured $O2_{fuel}$ quickly reaches $O2_{fuel,target}$. The measured PM reaches $PM_{target}$ after $O2_{fuel}$ reaches $O2_{fuel,target}$ because the volume of exhaust in the exhaust passage is large and changes in the exhaust PM level resulting from fuel combustion changes may be delayed as they percolate through the entire exhaust passage. At time t4, in response to measured PM matching $PM_{target}$ and $O2_{fuel}$ matching $O2_{fuel,target}$, control system 190 maintains current engine and fuel system operating conditions relating to PM reduction. From time t3 to time t4, $Level_{fuel1}$ is steadily decreases, but at a slower rate than from t1 to t2, as the higher oxygenated fuel, fuel1, is consumed from fuel tank 210.

At time t5, in response to $Level_{fuel1}$ decreasing below $Level_{TH}$, to slow the increase in PM emissions, control system 190 switches the EGR OFF, limits engine load below $Load_{TH}$, and notifies the operator via message center 197 of the depleted higher oxygenated fuel tank and recommends refueling. After time t5, because only the lower oxygenated fuel remains to propel the vehicle, $O2_{fuel}$ begins to decrease below $O2_{fuel,target}$, and PM begins to increase above $PM_{target}$.

Turning now to FIG. 8, it illustrates a timeline 800 for operating an engine and a fuel system according to the method shown in FIGS. 3-6 for reducing exhaust particle emissions. Timeline 800 includes trend lines for exhaust PM 810, measured $O2_{fuel}$ 820, fuel flow rate ratio of a higher oxygenated fuel to a lower oxygenated fuel, $Q_{fuelratio12}$ 830, fuel flow rate ratio of a lower oxygenated fuel to a higher oxygenated fuel $Q_{fuelratio21}$ 834, VCV position 840, PCV position 850, engine load 860, EGR status 870, fuel level of higher oxygenated fuel, fuel1, in fuel tank 1, $Level_{fuel1}$ 880, PM event status 886, and fuel rail pressure 890. Also shown are the desired PM level, $PM_{target}$ 812, desired fuel oxygen content, $O2_{fuel,target}$ 822, threshold engine load, $Load_{TH}$ 862, threshold tank level, $Level_{TH}$ 882, and desired fuel rail pressure 892.

The events and actions of timeline 800 are analogous to timeline 700, except control system 190 adjusts fuel flow rate ratios $Q_{fuelratio12}$ 830 and $Q_{fuelratio21}$ 834 in response to deviations of measured PM from $PM_{target}$ and deviations of measured $O2_{fuel}$ from $O2_{fuel,target}$ to increase or decrease the fuel oxygen content delivered to the high pressure pump and engine. In other words, control system 190 increases $Q_{fuelratio12}$ and decreases $Q_{fuelratio21}$ to increase the fuel oxygen content delivered to the engine in response to a measured $PM > PM_{target}$ and a measured $O2_{fuel} < O2_{fuel,target}$. Similarly, control system 190 increases $Q_{fuelratio21}$ and decreases $Q_{fuelratio12}$ to decrease the fuel oxygen content delivered to the engine (and increase fuel economy) in response to a measured $PM < PM_{target}$ and a measured $O2_{fuel} > O2_{fuel,target}$.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an engine;
a fuel system, including a first fuel tank, a second fuel tank, a pressure control valve (PCV) positioned between a fuel rail and a blend fuel tank, and a volume control valve (VCV) positioned between a high pressure fuel pump and the blend fuel tank; and
a controller, with executable instructions to,
   in response to an exhaust particulate matter (PM) level deviating from a target PM level,
      open the VCV and the PCV to purge fuel from the high pressure fuel pump and the fuel rail to the blend fuel tank, and
      adjust a fuel oxygen content delivered to the engine by adjusting a fuel flow rate from one of the first fuel tank, the second fuel tank, and the blend fuel tank, and
   in response to depleting the first fuel tank, operating the engine below a threshold engine load, wherein the executable instructions to adjust the fuel oxygen content delivered to the engine comprise raising the fuel oxygen content by raising a flow rate of a higher oxygenated fuel from the first fuel tank in response to the exhaust PM level increasing above the target PM level.

2. The vehicle system of claim 1, wherein the executable instructions to adjust the fuel oxygen content delivered to the engine further comprise lowering the fuel oxygen content by raising a flow rate of a lower oxygenated fuel from the second fuel tank in response to the exhaust PM level decreasing below the target PM level.

3. The vehicle system of claim 1, wherein
the fuel system further includes a low pressure fuel pump positioned in one of the first fuel tank, the second fuel tank, and the blend fuel tank, and
the executable instructions further comprise, in response to the exhaust PM level deviating from the target PM level, increasing a pump speed of the low pressure fuel pump above a threshold pump speed.

* * * * *